United States Patent
Bates et al.

(10) Patent No.: US 9,587,857 B2
(45) Date of Patent: Mar. 7, 2017

(54) POLYMERIC SOLAR CONCENTRATOR AND SOLAR THERMAL DEVICE INCORPORATING SAME

(75) Inventors: David J. Bates, Brookline, MA (US);
Andrew L. Haynes, Auckland (NZ);
Ashton C. Partridge, Auckland (NZ)

(73) Assignees: Morningside Technology Ventures Ltd, Monte Carlo (MC); ZinniaTek Limited, Auckland (NZ)

( * ) Notice: Subject to any disclaimer, the term of this patent is extended or adjusted under 35 U.S.C. 154(b) by 367 days.

(21) Appl. No.: 14/113,439

(22) PCT Filed: Apr. 24, 2012

(86) PCT No.: PCT/US2012/034783
§ 371 (c)(1),
(2), (4) Date: Nov. 27, 2013

(87) PCT Pub. No.: WO2012/148905
PCT Pub. Date: Nov. 1, 2012

(65) Prior Publication Data
US 2014/0069417 A1  Mar. 13, 2014

Related U.S. Application Data

(60) Provisional application No. 61/478,698, filed on Apr. 25, 2011.

(51) Int. Cl.
| | |
|---|---|
| *F24J 2/06* | (2006.01) |
| *G02B 27/09* | (2006.01) |
| *F24J 2/08* | (2006.01) |

(52) U.S. Cl.
CPC ............... *F24J 2/06* (2013.01); *F24J 2/085* (2013.01); *G02B 27/0955* (2013.01);
(Continued)

(58) Field of Classification Search
CPC .......... F24J 2/085; F24J 2/06; G02B 27/0972; Y10T 428/24355; Y02E 10/43
(Continued)

(56) References Cited

U.S. PATENT DOCUMENTS

| | | | | |
|---|---|---|---|---|
| 4,148,300 A | * | 4/1979 | Kaufman, Sr. | ............ F24J 2/06 126/684 |
| 4,257,401 A | * | 3/1981 | Daniels | .................... F24J 2/067 126/602 |

(Continued)

FOREIGN PATENT DOCUMENTS

| | | |
|---|---|---|
| WO | WO 2007/058548 | 5/2007 |
| WO | WO 2010/041962 | 4/2010 |
| WO | WO 2010099620 | 9/2010 |

OTHER PUBLICATIONS

Extended European search report issued in European Application No. 12777243.2, Nov. 18, 2014.
(Continued)

*Primary Examiner* — Avinash Savani
*Assistant Examiner* — Rabeeul Zuberi
(74) *Attorney, Agent, or Firm* — Bell & Manning, LLC

(57) ABSTRACT

Polymeric sheets suitable for use as solar concentrators in solar thermal devices are provided. Also provided are solar thermal devices incorporating the polymeric sheets. The polymeric sheets have two oppositely facing surfaces. A first pattern is defined in the first surface and a second pattern is defined in the second surface. The first pattern is designed to reduce the reflectance of light incident upon the first surface relative to the first surface in the absence of the first pattern and to channel incident light through the sheet onto the second surface. It does so by redirecting photons incident upon the first surface over a broad range of incident angles into transmittance angles that are more closely aligned with the surface normal of the polymeric sheet. The second
(Continued)

pattern is designed to focus the photons transmitted to the second surface of the sheet onto a focal surface, such as a receptacle containing a heat-transfer medium.

22 Claims, 25 Drawing Sheets

(52) U.S. Cl.
CPC .......... *G02B 27/0972* (2013.01); *Y02E 10/43* (2013.01); *Y10T 428/24355* (2015.01)

(58) Field of Classification Search
USPC .......................... 359/558, 563, 851; 126/714
See application file for complete search history.

(56) References Cited

U.S. PATENT DOCUMENTS

| | | | |
|---|---|---|---|
| 4,299,201 A | 11/1981 | Tsubota | |
| 4,456,783 A | 6/1984 | Baker | |
| 5,161,057 A * | 11/1992 | Johnson | G02B 3/08 359/565 |
| 5,577,492 A * | 11/1996 | Parkyn, Jr. | G02B 3/08 126/698 |
| 5,744,896 A * | 4/1998 | Kessinger, Jr. | H02K 3/04 310/198 |
| 6,958,868 B1 | 10/2005 | Pender | |
| 7,160,522 B2 | 1/2007 | Minano Dominguez et al. | |
| 2006/0245827 A1 * | 11/2006 | Rydin | A61H 3/066 404/9 |
| 2007/0146910 A1 | 6/2007 | Duston et al. | |
| 2007/0151558 A1 | 7/2007 | Duston et al. | |
| 2008/0271784 A1 | 11/2008 | Duston et al. | |
| 2009/0212698 A1 * | 8/2009 | Bailey | F21K 9/52 313/512 |
| 2010/0006088 A1 * | 1/2010 | Campbell | F24J 2/085 126/573 |
| 2010/0050560 A1 * | 3/2010 | Werner | F24J 2/14 52/693 |
| 2011/0067687 A1 | 3/2011 | Raymond et al. | |

OTHER PUBLICATIONS

Sun et al., Broadband moth-eye antireflection coatings on silicon, Applied Physics Letters, vol. 92, No. 061112, Feb. 14, 2008, pp. 1-3.

Deniz et al., Room temperature large-area nanoimprinting for broadband biomimetic antireflection surfaces, Applied Physics Letters, vol. 99, No. 183107, Nov. 2, 2011, pp. 1-3.

Chuang et al., Nanoscale of biomimetic moth eye structures exhibiting inverse polarization phenomena at the Brewster angle, Nanoscale, vol. 2, Mar. 8, 2010, pp. 799-805.

International Search Report and Written Opinion issued in PCT/US2012/034783, Nov. 23, 2012.

First Examiner's Report issued in Australian Application No. 2012249897, Apr. 8, 2016, 2 pp.

* cited by examiner

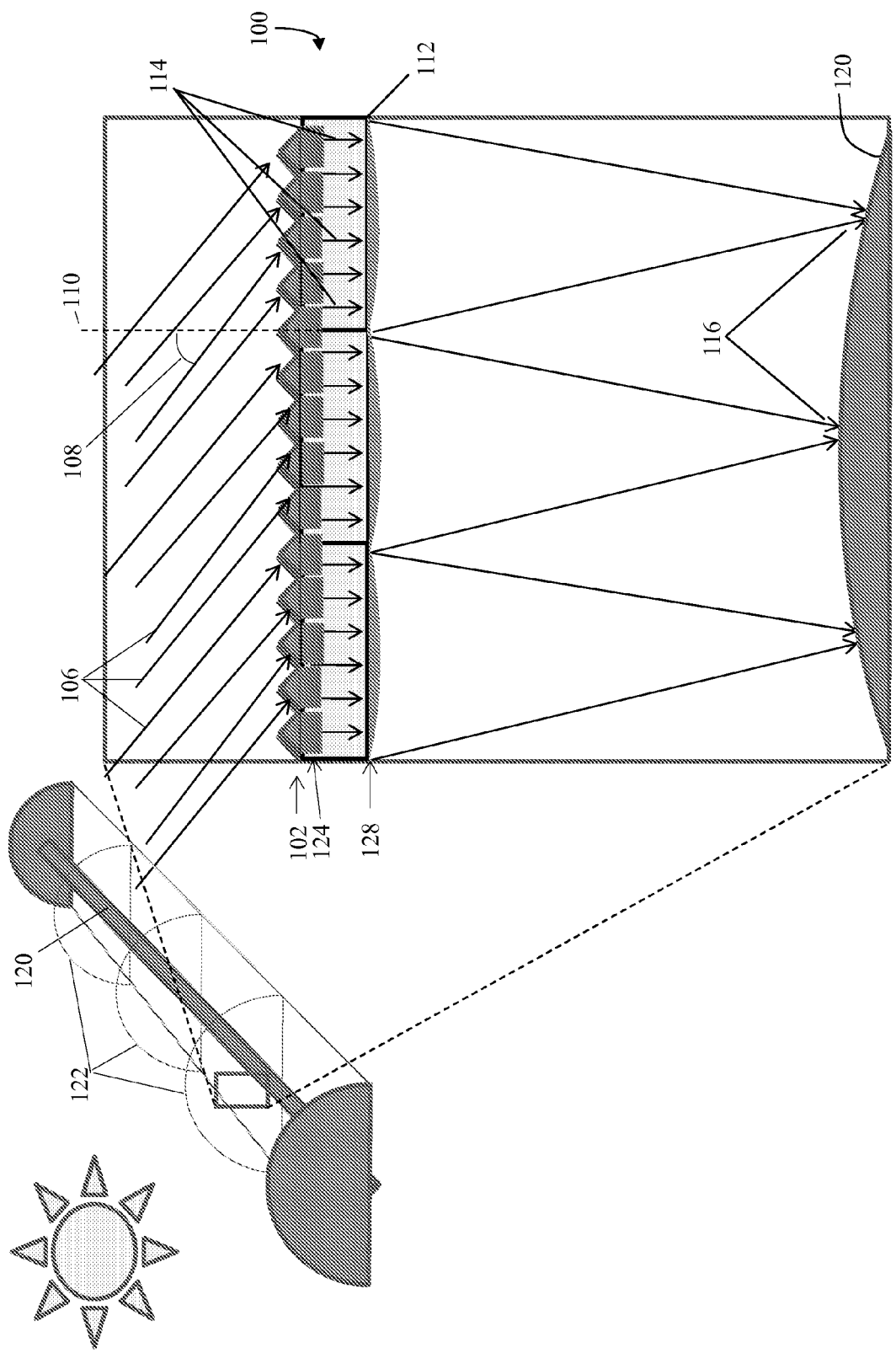

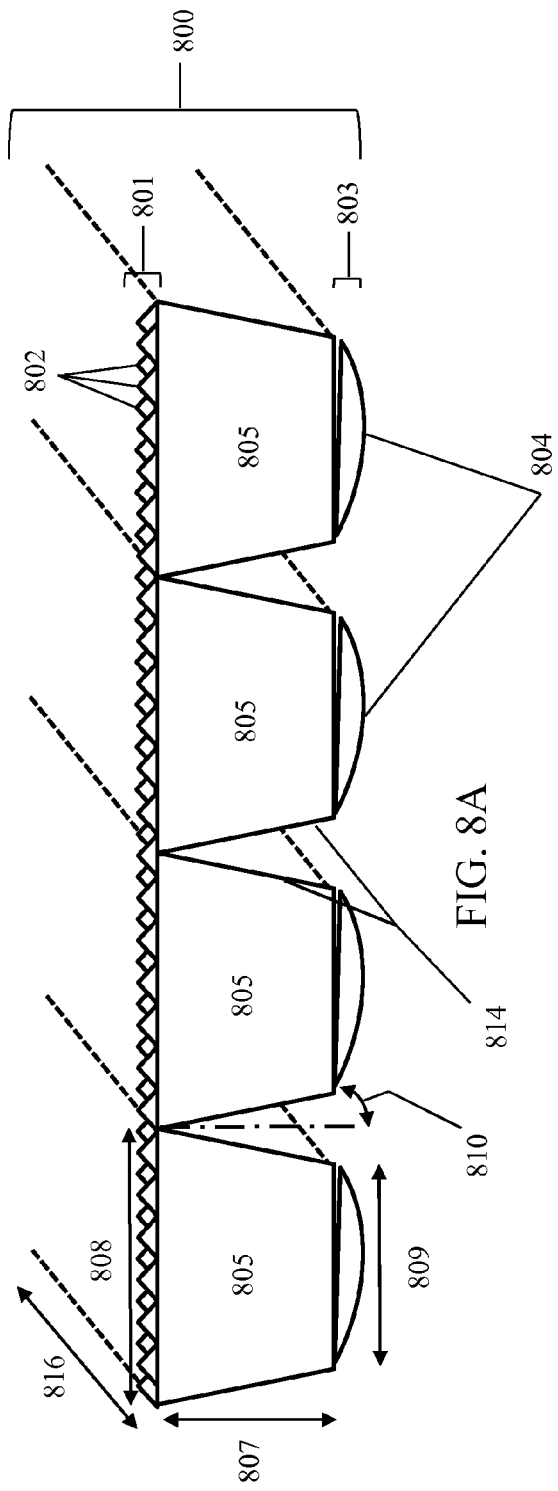
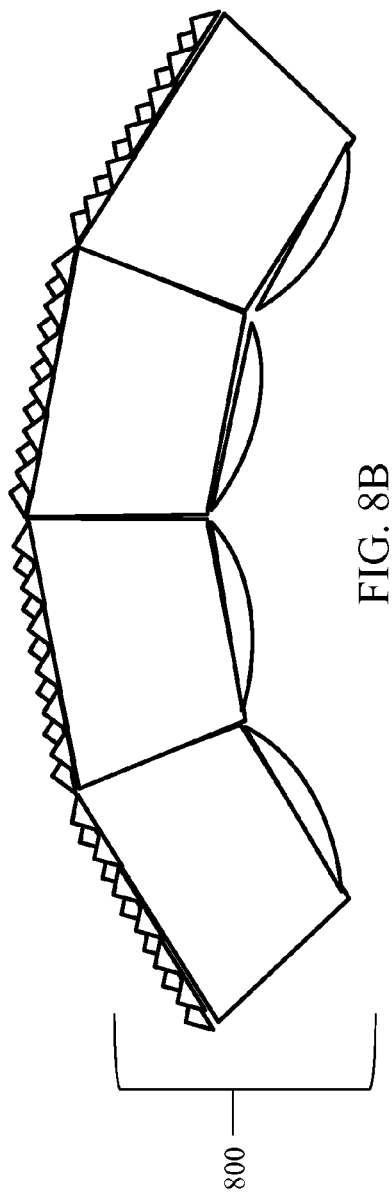
FIG. 8A
FIG. 8B

POLYMERIC SOLAR CONCENTRATOR AND SOLAR THERMAL DEVICE INCORPORATING SAME

CROSS REFERENCE TO RELATED APPLICATION

This application is a National Stage of International Application No. PCT/US2012/034783, filed Apr. 24, 2012, which claims priority from U.S. provisional patent application No. 61/478,698, filed on Apr. 25, 2011, the entire contents of which are incorporated herein by reference.

BACKGROUND

Solar concentrators concentrate large areas of incident sunlight into smaller areas. Solar concentrators find use in a variety of devices, including solar thermal devices, which use the concentrated sunlight to generate heat. Other devices include light separation devices, photon-gas reaction devices, devices to separate or isolate discrete wavelengths and devices for light synchronization and intensification. Depending upon the temperatures achieved by solar thermal devices, the heat can be used for a variety of purposes, e.g., commercial and residential heating of air and water, water sterilization and electrical power generation. Parabolic trough designs are one type of conventional solar concentrator used in solar thermal devices for electrical power generation. These designs include elongated parabolic mirrors aligned with the north-south axis of the earth. The concave surfaces of the parabolic mirrors are aimed toward the sun and are rotated to track the sun as it moves across the sky. Receptacles filled with heat-transfer medium run along the length of the parabolic mirrors at the focal point. Sunlight reflects off the parabolic mirrors and concentrates at the surface of the receptacle, thereby heating the medium within. Conventional solar concentrators, including parabolic trough designs, suffer from one or more of the following drawbacks: cost of materials, manufacturing and maintenance; less than desirable efficiencies in concentrating sunlight; and a need for tracking mechanisms to maintain the alignment of the concentrator with the sun.

SUMMARY

One aspect of the invention provides a sheet comprising: a first surface having a first pattern defined therein, the first pattern configured to redirect photons incident upon the first surface over a range of incident angles into a narrower range of transmittance angles, wherein the transmittance angles are more orthogonal than the incident angles; and a second surface disposed opposite the first surface and having a second pattern defined therein, the second pattern configured to focus the photons transmitted to the second surface onto a focal surface; wherein the sheet is comprised of an optically transparent polymeric material.

Another aspect of the invention provides a solar thermal device comprising: a receptacle configured to contain a heat-transfer medium; and a sheet comprising an optically transparent polymeric material configured over at least a portion of the surface of the receptacle. In the solar thermal device the sheet comprises: a first surface having a first pattern defined therein, the first pattern configured to redirect photons incident upon the first surface over a range of incident angles into a narrower range of transmittance angles, wherein the transmittance angles are more orthogonal than the incident angles; and a second surface disposed opposite the first surface and having a second pattern defined therein, the second pattern configured to focus the photons transmitted to the second surface onto the surface of the receptacle.

Another aspect of the invention provides a method of heating a heat-transfer medium using the above-described solar thermal device, the method comprising filling the receptacle in the solar thermal device with the heat-transfer medium and exposing the solar thermal device to sunlight.

Other principal features and advantages of the invention will become apparent to those skilled in the art upon review of the following drawings, the detailed description, the examples, and the appended claims.

BRIEF DESCRIPTION OF THE DRAWINGS

Illustrative embodiments of the invention will hereafter be described with reference to the accompanying drawings.

FIG. 1A shows the solar thermal device and the polymeric solar concentrator. In this device, the solar concentrator comprises a polymeric sheet with a plurality of triangular prisms patterned into its first surface and an array of Fresnel lenses patterned into its second surface. FIG. 1B shows a top view of a Fresnel lens.

FIG. 2A shows the solar thermal device and the polymeric solar concentrator. In this device, the solar concentrator comprises a polymeric sheet with a plurality of triangular prisms atop rectangular prisms patterned into its first surface and an array of Fresnel lenses patterned into its second surface. FIG. 2B shows a top view of a Fresnel lens.

In FIG. 5A, the solar concentrator comprises a polymeric sheet with a plurality of triangular prisms patterned into its first surface and an array of planoconvex lenses patterned into its second surface. In FIG. 5B, the solar concentrator comprises a polymeric sheet with a plurality of triangular prisms atop planoconcave lenses patterned into its first surface and an array of planoconvex lenses patterned into its second surface.

FIGS. 6A-C are schematic diagrams of other solar thermal devices incorporating a polymeric solar concentrator (insets) in accordance with this invention. In FIG. 6A, the solar concentrator comprises a polymeric sheet with a plurality of triangular prisms atop rectangular prisms patterned into its first surface and an array of planoconvex lenses patterned into its second surface. In FIG. 6B, the solar concentrator comprises a polymeric sheet with a plurality of triangular prisms patterned into its first surface and an array of planoconvex lenses patterned into its second surface. The receptacle is configured to define a plurality of holes through which light may pass. In FIG. 6C, the solar concentrator comprises a polymeric sheet with a plurality of triangular prisms atop planoconcave lenses patterned into its first surface and an array of planoconvex lenses patterned into its second surface. The receptacle is configured to define a plurality of holes through which light may pass.

FIG. 8 is a schematic diagram of a polymeric sheet comprising a plurality of keystone elements in accordance with this invention. The polymeric sheet also has a plurality of triangular prisms patterned into its first surface and an array of planoconvex lenses patterned into its second surface. A perspective view of a cross-section of the polymeric sheet is shown in FIG. 8A. The cross-section of the polymeric sheet after it has been curved is shown in FIG. 8B.

FIG. 11 is a schematic diagram of a solar thermal device incorporating a polymeric sheet in accordance with this invention.

FIG. 12 is a schematic diagram of a solar thermal device incorporating a polymeric sheet in accordance with this invention.

DETAILED DESCRIPTION

Figure 1:
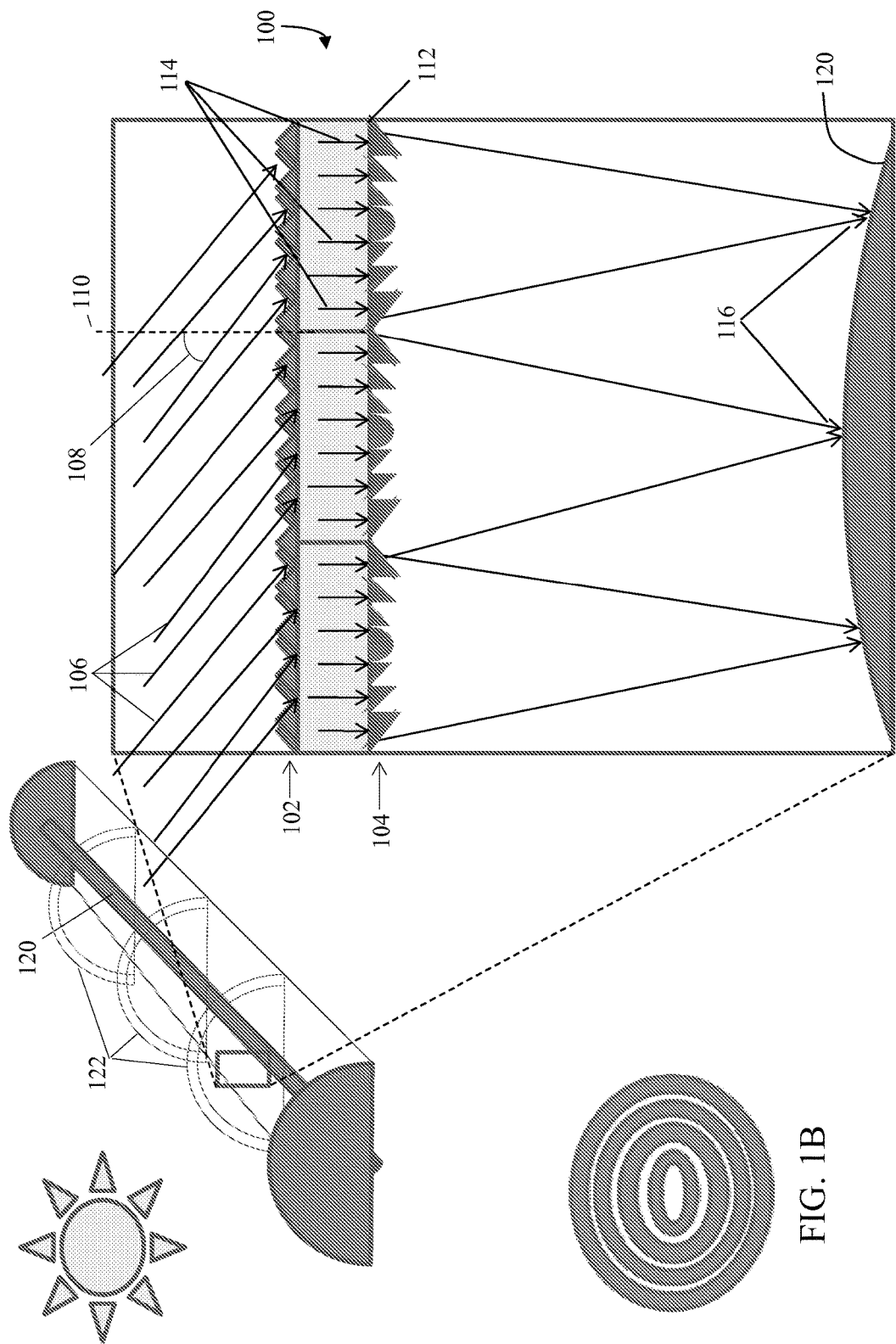
FIG. 1 is a schematic diagram of a solar thermal device incorporating a polymeric solar concentrator (inset) in accordance with this invention.
Figure 2:
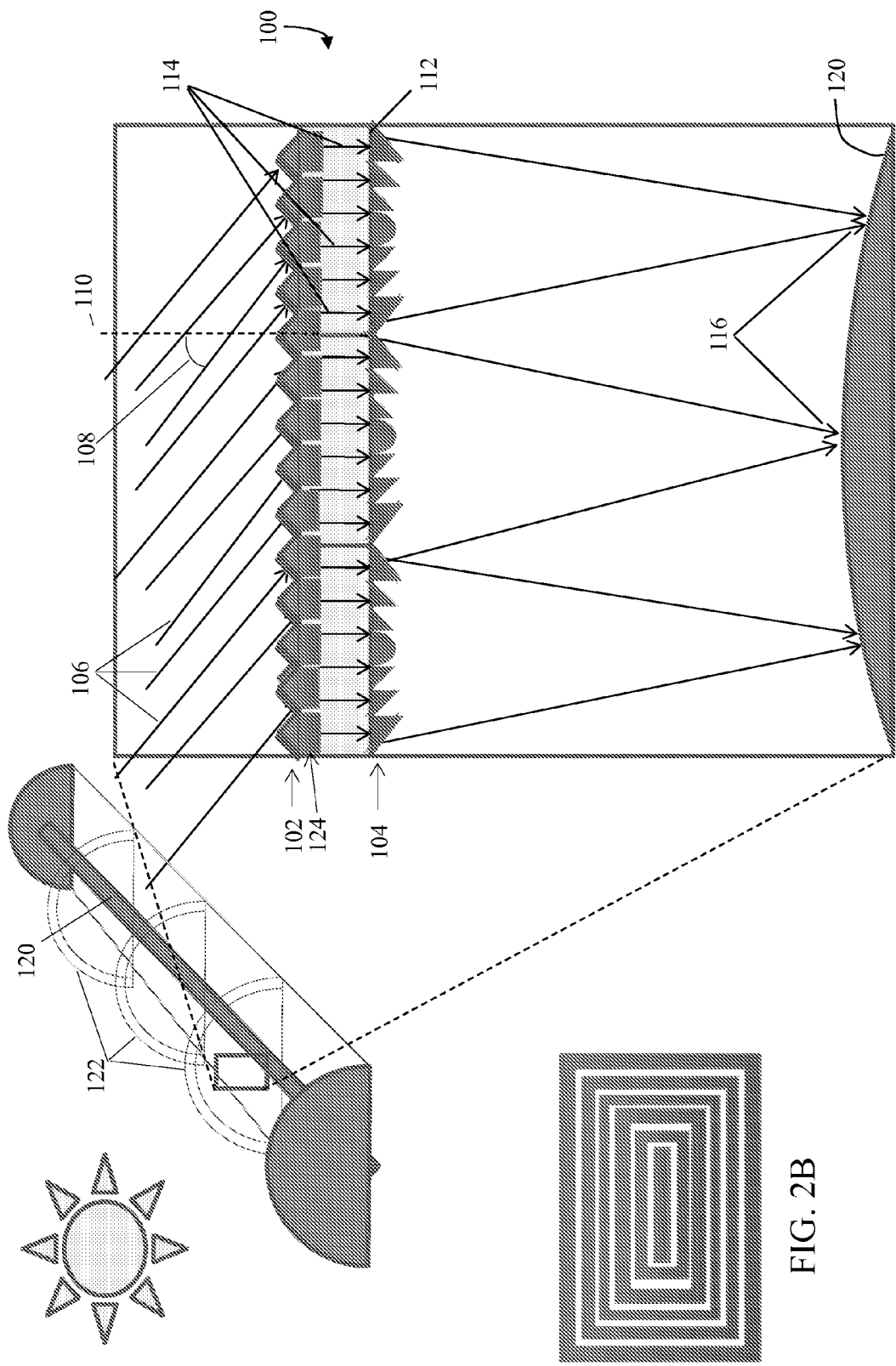
FIG. 2 is a schematic diagram of another solar thermal device incorporating a polymeric solar concentrator (inset) in accordance with this invention.

Provided herein are polymeric sheets suitable for use as solar concentrators in a variety of devices, including solar thermal devices. Also provided are methods of making the polymeric sheets and methods of using the solar thermal devices. At least some embodiments of the polymeric sheets exhibit the advantages of reduced cost and increased efficiency as compared to conventional solar concentrators. At least some embodiments of the solar thermal devices do not require any tracking mechanisms to maintain the alignment of the polymeric sheet with the sun.

Polymeric Sheet

One aspect of the present invention provides a polymeric sheet suitable for use as a solar concentrator. The polymeric sheet has two oppositely facing surfaces disposed opposite one another in a parallel or substantially parallel arrangement. A first pattern is defined in the first surface and a second, different pattern is defined in the second surface. The first pattern is designed to reduce the reflectance of light incident upon the first surface relative to the first surface in the absence of the first pattern and to collimate and channel that light through the sheet onto the second surface. It does so by redirecting photons incident upon the first surface over a broad range of incident angles into transmission angles that are more closely aligned with the surface normal of the polymeric sheet. The second pattern is positioned to receive the photons after they pass through the first surface and designed to focus those photons onto a focal surface located beneath the sheet. The range of incident angles can refer to an average range of the incident angles within a collection of incident photons. Similarly, a range of transmission angles can refer to an average range of the transmission angles within a collection of transmitted photons. These ranges or average ranges can be defined with respect to a particular position of the sun in the sky.

Because the first and second surfaces of the sheet include structures (e.g., nano-, micro- or macroscopic projections), for the purposes of this disclosure, the "surface normal" (from which the incident angles and transmittance angles are measured) refers to the global surface normal of the sheet, rather than a local surface normal defined by a particular structure on the first or second surfaces. Thus, the global surface normal can be defined, for example, with respect to a flat plane extending longitudinally through the sheet just above the pattern on the second surface, as shown by reference number 112 in FIG. 1. Photons that are redirected in a direction parallel to the global surface normal of the polymeric sheet are said to have an orthogonal transmission angle.

The polymeric sheet can comprise or consist of any polymer that is optically transparent to the incident photons to be transmitted and focused by the sheet. Alternatively, the polymeric sheet can comprise or consist of any polymer that is semi-optically transparent to the incident photons to be transmitted and focused by the sheet. Semi-optically transparent polymers can be useful for filtering, absorbing, reflecting or separating particular wavelengths of the electromagnetic spectrum. If the sheet is to be used as a solar concentrator, the polymeric material may be optically transparent to radiation present in sunlight, including infrared, visible and/or ultraviolet radiation.

The sheet may be thin enough to render it mechanically flexible. Alternatively, the sheet may be thick enough so that the sheet is capable of retaining a curved shape. The thicknesses at which the sheet may be mechanically flexible or capable of retaining a curved shape can depend upon the particular composition of the sheet. In some embodiments, the sheet has a thickness of no greater than about 100 mm. This includes embodiments in which the sheet has a thickness of no greater than about 50 mm, further includes embodiments in which the sheet has a thickness of no greater than about 10 mm, further includes embodiments in which the sheet has a thickness of no greater than about 5 mm and further includes embodiments in which the sheet has a thickness of no greater than about 3 mm. In some embodiments, the sheet has a thickness in the range of about 1 μm to about 100 mm. The sheet's thickness can refer to the average thickness of the sheet across the entire sheet.

The other dimensions of the sheet (e.g., the length and width for a rectangular sheet) may vary, depending upon the application. In some embodiments, the sheet is at least about 1 km long and at least about 30 m wide. This includes embodiments in which the sheet is at least about 100 m long and at least about 3 m wide, further includes embodiments in which the sheet is at least about 10 m long and at least about 1 m wide, further includes embodiments in which the sheet is at least about 1 m long and at least about 1 m wide, further includes embodiments in which the sheet is at least about 10 cm long and 1 cm wide, and further includes embodiments in which the sheet is at least about 1 cm long and at least about 1 cm wide. In some embodiments, the width and/or length of the sheet is in the range of about 1 μm to about 100 m. This includes embodiments in which the width and/or length of the sheet is in the range of about 1 μm to about 10 m and further includes embodiments in which the width and/or length of the sheet is in the range of about 1 μm to about 1 m. The sheets are not limited to rectangular shapes.

The polymeric sheet may be a single layer of polymeric material or may include two or more sub-layers of polymeric material sandwiched (e.g., laminated) together. Thus, in some embodiments, the polymeric sheets include layering of sub-layers of polymeric material in such a way that the sum of the multiple layers constitutes the patterned polymeric sheet. The sub-layers of polymeric material can have any of the thicknesses and other dimensions described above. Alternatively, the thicknesses and other dimensions described above can refer to the entire stack of sub-layers of polymeric material. In addition, single layers of polymeric material or stacks of sub-layers of polymeric material may be arranged in tandem (e.g., interlocked) to form polymeric sheets having other dimensions which are within, or even greater than, those described above. Sub-layers can be made up of the same type or different types of polymeric material.

Examples of suitable polymers from which the sheet can be made include, but are not limited to, polyvinylidene difluoride (PVDF), polyvinyl chloride (PVC), thermoplastic polyurethanes (TPU), polycarbonate, polystyrene, polymethyl methacrylate (PMMA) and high density polyethylene (HDPE). Other suitable polymers include, poly(hexafluoropropylene oxide), alginic acid, sodium salt, hydroxypropyl cellulose, poly(tetrafluoroethylene-co-hexafluoropropylene), fluorinated ethylene propylene, poly(pentadecafluorooctyl acrylate), poly(tetrafluoro-3-(heptafluoropropoxy) propyl acrylate), poly(tetrafluoro-3-(pentafluoroethoxy) propyl acrylate), poly(tetrafluoroethylene), tetrafluoroethylene hexafluoropropylene vinylidene fluoride, poly(undecafluorohexyl acrylate), perfluoroalkoxy, ethylene tetrafluoroethylene, poly(nonafluoropentyl acrylate), poly(tetrafluoro-3-(trifluoromethoxy)propyl acrylate), poly(pentafluorovinyl propionate), poly(heptafluorobutyl acrylate), poly(trifluorovinyl acetate), poly(octafluoropentyl acrylate), poly(methyl 3,3,3-trifluoropropyl siloxane), poly (pentafluoropropyl acrylate), poly(2-heptafluorobutoxy) ethyl acrylate), poly(chlorotrifluoroethylene), poly(2,2,3,4,4-hexafluorobutyl acrylate), poly(methyl hydro siloxane), poly(methacrylic acid), sodium salt, poly(dimethyl siloxane), poly(trifluoroethyl acrylate), poly(2-(1,1,2,2-tetrafluoroethoxy)ethyl acrylate), poly(trifluoroisopropyl methacrylate), poly(2,2,2-trifluoro-1-methylethyl methacrylate), poly (2-trifluoroethoxyethyl acrylate), poly(vinylidene fluoride), ethylene chlorotrifluorotheylene, poly(trifluoroethyl methacrylate), poly(methyl octadecyl siloxane), poly(methyl hexyl siloxane), poly(methyl octyl siloxane), poly(isobutyl methacrylate), poly(vinyl isobutyl ether), poly(methyl hexadecyl siloxane), poly(ethylene oxide), poly(vinyl ethyl ether), poly(methyl tetradecyl siloxane, poly(ethylene glycol mono-methyl ether), poly(vinyl n-butyl ether), poly(propylene oxide), poly(3-butoxypropylene oxide), poly(3-hexoxypropylene oxide), poly(ethylene glycol), poly(vinyl n-pentyl ether), poly(vinyl n-hexyl ether), poly(4-fluoro-2-trifluoromethylstyrene), poly(vinyl octyl ether), poly(vinyl n-octyl acrylate), poly(vinyl 2-ethylhexyl ether), poly(vinyl n-decyl ether), poly(2-methoxyethyl acrylate), poly(acryloxypropyl methyl siloxane), poly(4-methyl-1-pentene), poly(3-methoxypropylene oxide, poly(t-butyl methacrylate), poly (vinyl n-dodecyl ether), poly(3-ethoxypropyl acrylate), poly (vinyl propionate), poly(vinyl acetate), poly(vinyl propionate), poly(vinyl methyl ether), poly(ethyl acrylate), poly(vinyl methyl ether)(isotactic), poly(3-methoxypropyl acrylate), poly(1-octadecene), poly(2-ethoxyethyl acrylate), poly(isopropyl acrylate), poly(1-decene), poly(propylene) (atactic), poly(lauryl methacrylate), poly(vinyl sec-butyl ether)(isotactic), poly(n-butyl acrylate), poly(dodecyl methacrylate), poly(ethylene succinate), poly(tetradecyl methacrylate), poly(hexadecyl methacrylate), cellulose acetate butyrate, cellulose acetate, poly(vinyl formate), ethylene/vinyl acetate copolymer-40% vinyl acetate, poly(2-fluoroethyl methacrylate), poly(octyl methyl silane), ethyl cellulose, poly(methyl acrylate), poly(dicyanopropyl siloxane), poly(oxymethylene) or polyformaldehyde, poly(sec-butyl methacrylate), poly(dimethylsiloxane-co-alpha-methylstyrene), poly(n-hexyl methacrylate), ethylene/vinyl acetate copolymer-33% vinyl acetate, poly(n-butyl methacrylate), poly(ethylidene dimethacrylate), poly(2-ethoxyethyl methacrylate), poly(n-propyl methacrylate), poly(ethylene maleate), ethylene/vinyl acetate copolymer-28% vinylacetate, poly(ethyl methacrylate), poly(vinyl butyral), poly (vinyl butyral)-11% hydroxyl, poly(3,3,5 trimethylcyclohexyl methacrylate), poly(2-nitro-2-methylpropyl methacrylate), poly(dimethylsiloxane-co-diphenylsiloxane), poly(1,1-diethylpropyl methacrylate), poly(triethylcarbinyl methacrylate), poly(methyl methacrylate), poly(2-decyl-1, 4-butadiene), poly(propylene), isotactic, poly(vinyl butyral)-19% hydroxyl, poly(mercaptopropyl methyl siloxane), poly(ethyl glycolate methacrylate), poly(3-methylcyclohexyl methacrylate), poly(cyclohexyl alpha-ethoxyacrylate), methyl cellulose, poly(4-methylcyclohexyl methacrylate), poly(decamethylene glycol dimethacrylate), poly(vinyl alcohol), poly(vinyl formal), poly(2-bromo-4-trifluoromethyl styrene), poly(1,2-butadiene), poly(sec-butyl alpha-chloroacrylate), poly(2-heptyl-1,4-butadiene), poly(vinyl methyl ketone), poly(ethyl alpha-chloroacrylate), poly(vinyl formal), poly(2-isopropyl-1,4-butadiene, poly(2-methylcyclohexyl methacrylate), poly(bornyl methacrylate), poly(2-t-butyl-1,4-butadiene), poly(ethylene glycol dimethacrylate), poly(cyclohexyl methacrylate), poly(cyclohexanediol-1,4-dimethacrylate), butyl rubber (unvulcanized), gutta percha b, poly(tetrahydrofurfuryl methacrylate), poly(isobutylene), polyethylene, low density, ethylene/methacrylic acid ionomer, sodium ion, polyethylene, cellulose nitrate, polyethylene Ionomer, polyacetal, poly(1-methylcyclohexyl methacrylate), poly(2-hydroxyethyl methacrylate), poly(1-butene)(isotactic), poly(vinyl methacrylate), poly(vinyl chloroacetate), poly(n-butyl methacrylamide), gutta percha a, poly(2-chloroethyl methacrylate), poly(methyl alpha-chloroacrylate), poly(2-diethylaminoethyl methacrylate), poly(2-chlorocyclohexyl methacrylate), poly(1,4-butadiene)(35% cis; 56% trans; 7% 1,2-content), poly(acrylonitrile), poly(isoprene),cis, poly(allyl methacrylate), poly(methacrylonitrile), poly(methyl isopropenyl ketone), poly(butadiene-co-acrylonitrile), poly(2-ethyl-2-oxazoline), poly(1,4-butadiene)(high cis-type), poly(n-2 methoxyethyl)methacrylamide, poly(2,3-dimethylbutadiene){methyl rubber}, poly(2-chloro-1-(chloromethyl)ethyl methacrylate), poly(1,3-dichloropropyl methacrylate), poly(acrylic acid), poly(n-vinyl pyrrolidone), nylon 6 {poly(caprolactam)}, poly(butadiene-co-styrene) (30%) styrene) block copolymer, poly(cyclohexyl alpha-chloroacrylate), poly(methyl phenyl siloxane), poly(2-chloroethyl alpha-chloroacrylate), poly(butadiene-co-styrene) (75/25), poly(2-aminoethyl methacrylate), poly(furfuryl metacrylate), poly(vinyl chloride), poly(butylmercaptyl methacrylate), poly(1-phenyl-n-amyl methacrylate), poly(n-methyl methacrylamide), polyethylene, high density, cellulose, poly(cyclohexyl alpha-bromoacrylate), poly(sec-butyl alpha-bromoacrylate), poly(2-bromoethyl methacrylate), poly(dihydroabietic acid), poly(abietic acid), poly(ethylmercaptyl methacrylate), poly(n-allyl methacrylamide), poly(1-phenylethyl methacrylate), poly(2-vinyltetrahydrofuran), poly(vinylfuran), poly(methyl m-chlorophenylethyl siloxane), poly(p-methoxybenzyl methacrylate), poly(isopropyl methacrylate), poly(p-isopropyl styrene), poly(isoprene), chlorinated, poly(p,p'-xylylenyl dimethacrylate), poly(cyclohexyl methyl silane), poly(1-phenylallylmethacrylate), poly(p-cyclohexylphenyl methacrylate), poly(chloroprene), poly(2-phenylethyl methacrylate), poly(methyl m-chlorophenyl siloxane), poly{4,4-heptane bis(4-phenyl)carbonate}, poly{1-(o-chlorophenyl)ethyl methacrylate)}, styrene/maleic anhydride copolymer, poly(1-phenylcyclohexyl methacrylate), nylon 6,10{poly(hexamethylene sebacamide)}, nylon 6,6{poly(hexamethylene adipamide)}, nylon 6(3)t{poly(trimethyl hexamethylene terephthalamide)}, poly(2,2,2'-trimethylhexamethylene terephthalamide), poly(methyl alpha-bromoacrylate), poly(benzyl methacrylate), poly{2-(phenylsulfonyl)ethyl methacrylate}, poly(m-cresyl methacrylate), styrene/acrylonitrile copolymer, poly(o-methoxyphenol methacrylate), poly(phenyl methacrylate), poly(o-cresyl methacrylate), poly(diallyl phthalate), poly(2, 3-dibromopropyl methacrylate), poly(2,6-dimethyl-p-phenylene oxide), poly(ethylene terephthalate), poly(vinyl benozoate), poly{2,2-propane bis[4-(2-methylphenyl)]carbonate, poly{1,1-butane bis(4-phenyl)carbonate}, poly(1,2-diphenylethyl methacrylate), poly(o-chlorobenzyl methacrylate), poly(m-nitrobenzyl methacrylate), poly(oxycarbonyloxy-1,4-phenyleneisopropylidene-1,4-phenylene), poly{n-(2 phenylethyl)methacrylamide}, poly{1,1-cyclohexane bis[4-(2,6-dichlorophenyl)]carbonate}, polycarbonate resin, bisphenol-a polycarbonate, poly(4-methoxy-2-methylstyrene), poly(o-methyl styrene), polystyrene, poly{2,2-propane bis[4-(2-chlorophenyl)]carbonate}, poly{1,1-cyclohexane bis(4-phenyl)carbonate}, poly(o-methoxy styrene), poly(diphenylmethyl methacrylate), poly{1,1-ethane bis(4-phenyl)carbonate}, poly(propylene sulfide), poly(p-bromophenyl methacrylate), poly(n-benzyl methacrylamide), poly(p-methoxy styrene), poly(4-methoxystyrene), poly{1,1-cyclopentane bis(4-phenyl)carbonate}, poly(vinylidene chloride), poly(o-chlorodiphenylmethyl methacrylate), poly{2,2-propane bis[4-(2,6-dichlorophenyl)]carbonate}, poly(pentachlorophenyl methacrylate), poly(2-chlorostyrene), poly(alpha-methylstyrene), poly(phenyl alpha-bromoacrylate), poly{2,2-propane bis[4-(2,6-dibromophenyl)cabonate]}, poly(p-divinylbenzene), poly(n-vinyl phthalimide), poly(2,6-dichlorostyrene), poly(chloro-p-xylene), poly(beta-naphthyl methacrylate), poly(alpha-naphthyl carbinyl methacrylate), polyetherimide (880 nm wavelength), polyetherimide (643.8 nm wavelength), polyetherimide (587.6 nm wavelength), polyetherimide (546.1 nm wavelength), polyetherimide (480 nm wavelength), poly(phenyl methyl silane), poly(sulfone) {poly[4,4'-isopropylidene diphenoxy di(4-phenylene)sulfone]}, polysulfone resin, poly(2-vinylthiophene), polyethylene terephthalate (bopet), poly(2,6-diphenyl-1,4-phenylene oxide), poly(alpha-naphthyl methacrylate), poly(p-phenylene ether-sulphone), poly{diphenylmethane bis(4 phenyl)carbonate}, poly(vinyl phenyl sulfide), poly(styrene sulfide), butylphenol formaldehyde resin, poly(p-xylylene), poly(2-vinylnapthalene), poly(n-vinyl carbazole), naphthalene-formaldehyde rubber, phenol-formaldehyde resin, poly(pentabromophenyl methacrylate) and polytetrafluoroethylene-perfluoromethylvinylether. The polymeric sheet can comprise combinations of different types of polymers.

The polymeric sheet can comprise various additives. Exemplary additives include those which alter the physical, mechanical, chemical, optical, magnetic, thermal and/or electrical characteristics of the polymeric sheet. Exemplary additives can include those which provide stress relief, impact resistance, tensile strength and/or notch resistance. Other exemplary additives include those which provide hydrophobicity, hydrophilicity, chemical reactivity, chemical resistance, photo resistance and/or UV resistance. Cross-linking additives are possible. Additives for imparting frequency converting, light emitting, luminescent and/or light absorbing properties to the polymeric sheet are possible. Other exemplary types of additives include plasticizers to increase flexibility and heat stabilizers and antioxidants to prevent polymer degradation. The type and amount of additive will depend upon the type of polymer and the application. Similarly, the type of polymer will depend upon the application.

The sheets can be made from materials besides polymers. In some embodiments, the sheets are made from glass or metal. The sheets can include one or more sub-layers of glass or metal.

As noted above, the first pattern defined in the first surface of the polymeric sheet is designed to reduce the reflectance of light incident upon the first surface relative to the first surface in the absence of the first pattern and to collimate and channel that light through the sheet onto the second surface. In some embodiments, the first pattern comprises a plurality of projections having nanoscale dimensions. As used herein, a nanoscale dimension is a dimension of no greater than about 1000 nm. Projections having nanoscale dimensions can have a maximum dimension of no greater than about 1000 nm. In some embodiments, the first pattern comprises a plurality of projections having microscale dimensions. As used herein, a microscale dimension is a dimension of no greater than about 1000 µm. Projections having microscale dimensions can have a maximum dimension of no greater than about 1000 µm. In some embodiments, the first pattern comprises a plurality of projections having macroscale dimensions. As used herein, a macroscale dimension is a dimension of no greater than about 1000 mm. Projections having nanoscale dimensions can have a maximum dimension of no greater than about 1000 mm.

Possible shapes of the projections include, but are not limited to, cylinders, nipples, cones and prisms. Triangular and non-triangular (e.g., pyramidal and rectangular) prisms are possible. The tops of the projections may be flat, rounded or pointed. Cylinders, nipples and cones may be characterized by a diameter at the base and a height from the base to the top. Cylinders, nipples and cones having nanoscale dimensions can have diameters and heights of no greater than about 1000 nm. Cylinders, nipples and cones having microscale dimensions can have diameters and heights of no greater than about 1000 µm. Cylinders, nipples and cones having macroscale dimensions can have diameters and heights of no greater than about 1000 mm. Prisms may be characterized by a length and width at the base and a height from the base to the top. Prisms having nanoscale dimensions can have lengths, widths and heights of no greater than about 1000 nm. Prisms having microscale dimensions can have lengths, widths and heights of no greater than about 1000 µm. Prisms having macroscale dimensions can have lengths, widths and heights of no greater than about 1000 mm.

Other shapes for the projections are possible, including ridges extending substantially linearly along, and substantially parallel to, the first surface of the polymeric sheet. The ridges may be characterized by a length and width at the base and a height from the base to the top. Ridges having nanoscale dimensions can have widths and heights of no greater than about 1000 nm. Ridges having microscale dimensions can have widths and heights of no greater than about 1000 µm. Ridges having macroscale dimensions can have widths and heights of no greater than about 1000 mm. The lengths, however, can extend substantially along the length (or width) of the entire polymeric sheet.

In some embodiments, the nanoscale projections that make up the first pattern will have a maximum dimension of no greater than about 500 nm. This includes embodiments in which the nanoscale projections have a maximum dimension of no greater than about 100 nm and further includes embodiments in which the nanoscale projections have a maximum dimension of no greater than about 10 nm. In some embodiments, the microscale projections that make up the first pattern will have a maximum dimension of no greater than about 500 µm. This includes embodiments in which the microscale projections have a maximum dimension of no greater than about 100 µm and further includes embodiments in which the microscale projections have a maximum dimension of no greater than about 10 µm. In some embodiments, the macroscale projections that make up the first pattern will have a maximum dimension of no greater than about 500 mm. This includes embodiments in which the macroscale projections have a maximum dimension of no greater than about 100 mm and further includes embodiments in which the macroscale projections have a maximum dimension of no greater than about 10 mm.

The dimensions (e.g., diameters, lengths, widths, heights) of the projections discussed above can refer to the average dimensions of the projections within the plurality of projections. By way of illustration only, in some embodiments, the first pattern comprises a plurality of triangular prisms characterized by an average height of no greater than about 1000 nm, an average length of no greater than about 1000 nm and an average width of no greater than about 1000 nm.

The projections in the plurality of projections can be substantially uniformly-sized and can be patterned on the surface parallel or perpendicular to the extrusion direction (see, discussion of extrusion, below). Alternatively, the plurality of projections can include projections having a heterogeneous mix of dimensions to maximize incident light capture in certain areas of the device. That is, some areas of the first pattern may have smaller sized projections while different areas have larger sized projections depending on their position on the first surface.

The spacing between the projections, and therefore, the density of the projections, in the first pattern may vary. In some embodiments, the spacing between the centers of neighboring projections is nanoscale (i.e., no greater than 1000 nm). In some embodiments, the spacing between the centers of neighboring projections is no greater than 500 nm. This includes embodiments in which the spacing is no greater than about 400 nm and further includes embodiments in which the spacing is no greater than about 300 nm. In some embodiments, the spacing between the centers of neighboring projections is microscale (i.e., no greater than 1000 µm). In some embodiments, the spacing between the centers of neighboring projections is no greater than 500 µm. This includes embodiments in which the spacing is no greater than about 400 µm and further includes embodiments in which the spacing is no greater than about 300 µm. The spacing can refer to the average spacing of the projections within the plurality of projections. The spacing between the centers of neighboring nanoscale projections can be substantially uniform throughout the first pattern. Alternatively, some areas of the first pattern may have more densely packed projections while different areas have less densely packed projections depending on their position on the first surface.

In some embodiments, the first pattern comprises a plurality of projections having nanoscale dimensions, the projections configured in a moth-eye structure. The term "moth-eye structure" generally refers to hexagonal arrays of non-close packed cone or nipple projections having substantially uniform dimensions, and heights and center-to-center spacings of no greater than about 300 nm. The heights and center-to-center spacings can refer to the average height and center-to-center spacing of the projections within the plurality of projections. The antireflective properties of surfaces having moth-eye structures at various wavelengths, angles of incidence and polarization is discussed in the following references: Sun, Chih-Hung et al., Appl. Phys. Lett. 92, 061112 (2008); Chuang, Shang-Yu et al., Nanoscale, 2010, 2, 799-805; and Deniz, Hakan et al., Appl. Phys. Lett. 99, 183107 (2011).

Combinations of projections having different shapes are possible in the first pattern. By way of illustration only, the first pattern can comprise a plurality of triangular prisms disposed atop rectangular prisms. Embodiments of this type of first pattern are shown in FIGS. 2, 3, 4 and 6A and are further described below. The different shapes can have different dimensions. By way of illustration only, the first pattern can comprise a plurality of nanoscale projections (e.g., nanoscale triangular prisms) disposed atop microscale projections (e.g., microscale rectangular prisms).

Depending upon the specific design, the plurality of projections can provide the first surface with a refractive index gradient, thereby suppressing reflection and collimating light over a broad range of wavelengths and angles of incidence. In one embodiment, the first pattern can comprise a plurality of triangular prisms (e.g., nanoscale triangular prisms) disposed atop planoconcave lenses. Embodiments of this type of first pattern are shown in FIGS. 5B and 6C and are further described below. This design facilitates collimation of incident photons.

The first pattern is not limited to patterns comprising precisely-shaped and uniformly-sized nanoscale projections. First patterns having irregularly shaped and sized projections are possible. However, such first patterns may be less efficient at capturing and collimating light than first patterns comprising the projections, especially nanoscale projections, described above.

As noted above, the second pattern defined in the second surface of the polymeric sheet is designed to focus photons that have passed through the first surface onto a focal surface located beneath the sheet. In some embodiments, the second pattern comprises an array of lenses. A variety of lens types may be used. Lens types include, but are not limited to, Fresnel, imaging Fresnel, non-imaging Fresnel, convex, concave, biconvex, biconcave, planoconvex, planoconcave, positive meniscus, negative meniscus, and both positive (or converging) and negative (or diverging) lens types. The focal lengths of the lenses may range from about 1 cm to about 50,000 cm. In one embodiment, the focal length of the lenses is about 100 cm. In another embodiment, the focal length of the lenses is about 50 cm. The shape of the perimeter of the lenses may vary. For example, lenses having circular, rectangular or square perimeters are possible. Lens diameters or widths can vary, depending upon the desired focal length and/or energy capture requirements for the application. In some embodiments, the lens diameter or width is about 100 cm or less. This includes embodiments in which the lens diameter or width is about 10 cm or less, further includes embodiments in which the lens diameter or width is about 1 cm or less, further includes embodiments in which the lens diameter or width is about 100 µm or less, further includes embodiments in which the lens diameter or width is about 50 µm or less, further includes embodiments in which the lens diameter or width is about 20 µm or less, and further includes embodiments in which the lens diameter or width is about 10 µm or less. In some embodiments, the lens diameters or widths range from about 10 nm to about 10 cm. In one embodiment, the lens diameter or width is about 1 mm. In another embodiment, the lens diameter or width is about 1 cm. In another embodiment, the lens diameter or width is about 2 cm. The focal lengths, diameters and widths can refer to the average focal length, average diameter and average width of the lenses within the array of lenses. In some embodiments the density of lenses in the second pattern can be at least about 100 million/m$^2$. This includes embodiments in which the density of lenses in the second pattern can be at least about 20 billion/m$^2$ and further includes embodiments in which the density of lenses in the second pattern can be at least about 1000 billion/m$^2$.

In some embodiments, the second pattern comprises an array of Fresnel lenses. The dimensions and distribution of the Fresnel lenses is desirably uniform on the second surface. The focal path provided by the Fresnel lenses is determined by the curvature of the concentric rings of each Fresnel lens. Therefore, the optimal dimensions of the Fresnel lenses will be contingent on the application and power needs of the device into which the polymeric sheet is to be incorporated.

An embodiment of a polymeric sheet in accordance with this aspect of the invention is shown in the inset of FIG. 1A. The inset shows a cross-section of the polymeric sheet 100. In this embodiment, the polymeric sheet includes a first surface with a first pattern comprising a plurality of triangular prisms 102 having nanoscale dimensions. The polymeric sheet further includes a second surface with a second pattern comprising an array of Fresnel lenses 104 embossed therein. A top view of one Fresnel lens is shown in FIG. 1B.

Another embodiment of a polymeric sheet in accordance with this aspect of the invention is shown in the inset of FIG. 2A. The inset shows a cross-section of the polymeric sheet 100. In this embodiment, the polymeric sheet includes a first surface with a first pattern comprising a plurality of triangular prisms 102 having nanoscale dimensions. The triangular prisms are disposed atop rectangular prisms 124. This design helps to reduce the reflection of photons at the interface between the lower surface of the first pattern and the bulk of the polymeric sheet due to any differences in indices of refraction in a polymeric sheet composed of sub-layers of different material. The polymeric sheet further includes a second surface with a second pattern comprising an array of Fresnel lenses 104 embossed therein. A top view of one Fresnel lens is shown in FIG. 2B.

Figure 3:
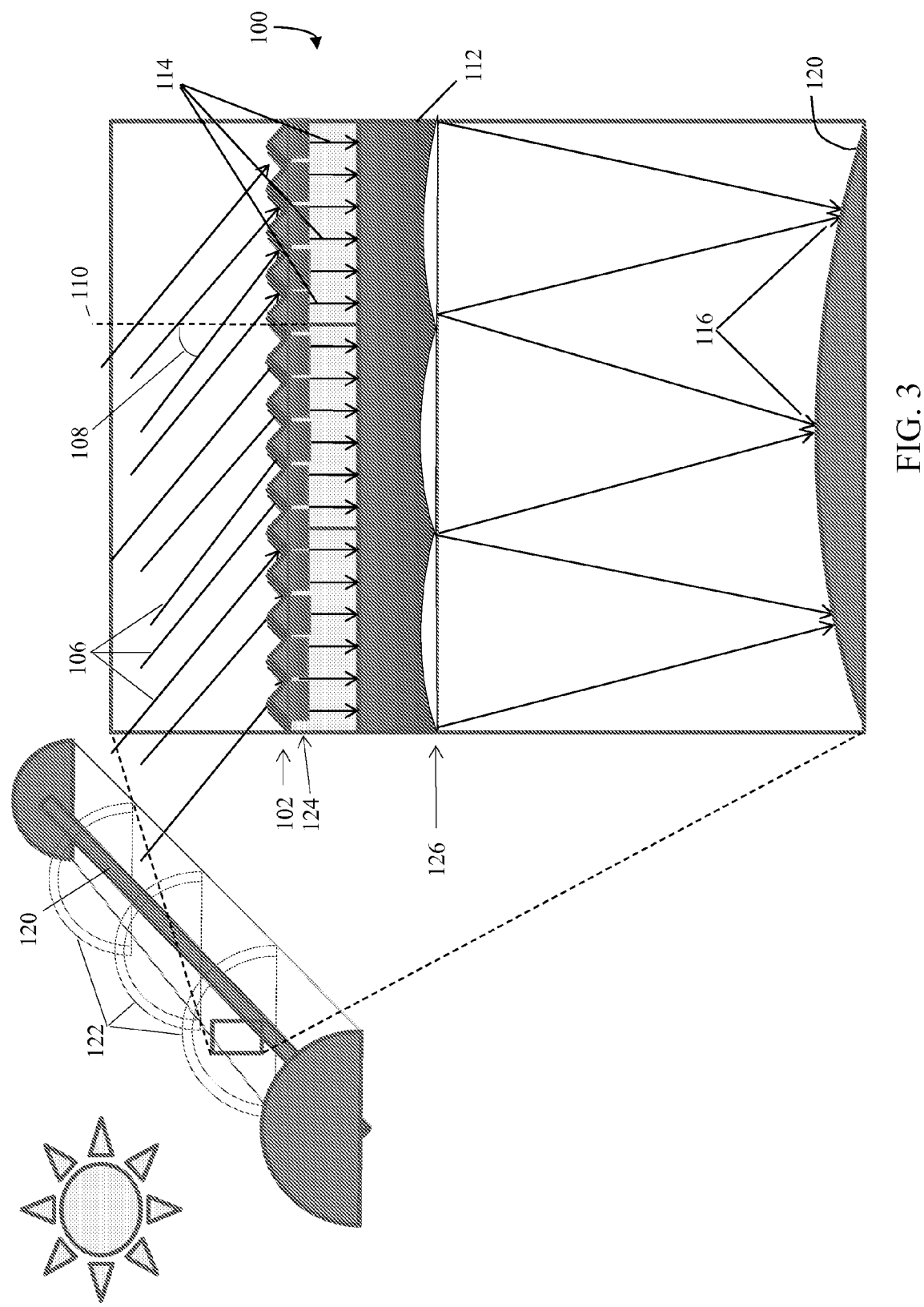
FIG. 3 is a schematic diagram of another solar thermal device incorporating a polymeric solar concentrator (inset) in accordance with this invention. In this device, the solar concentrator comprises a polymeric sheet with a plurality of triangular prisms atop rectangular prisms patterned into its first surface and an array of planoconcave lenses patterned into its second surface.
Figure 4:
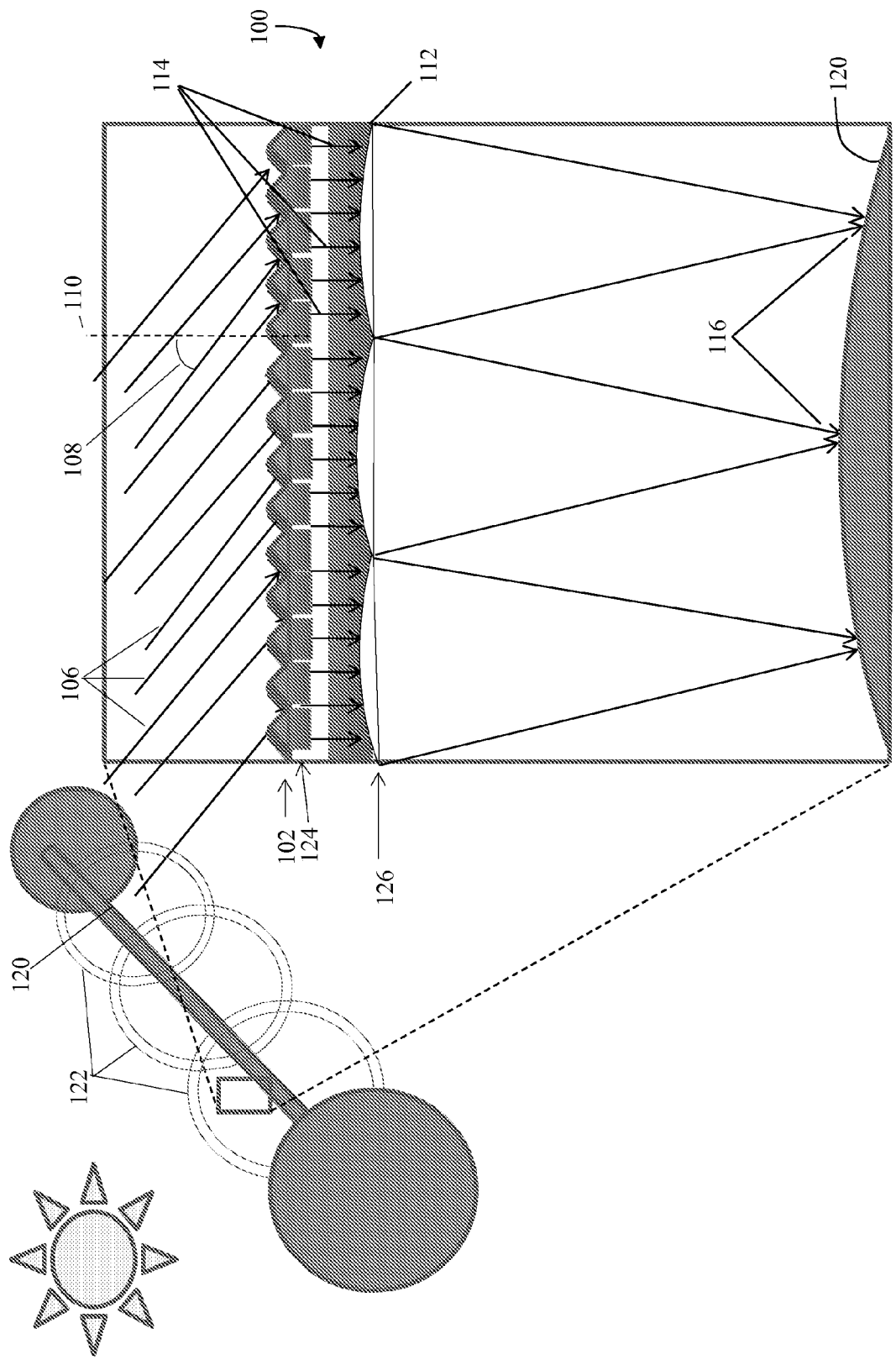
FIG. 4 is a schematic diagram of another solar thermal device incorporating a polymeric solar concentrator (inset) in accordance with this invention. In this device, the solar concentrator comprises a polymeric sheet with a plurality of triangular prisms atop rectangular prisms patterned into its first surface and an array of planoconcave lenses patterned into its second surface. The polymeric sheet completely surrounds the heat-transfer medium receptacle in this embodiment.

Other embodiments of a polymeric sheet in accordance with this aspect of the invention are shown in the insets of FIGS. 3 and 4. The insets show a cross-section of the polymeric sheet 100. In these embodiments, the polymeric sheet includes a first surface with a first pattern comprising a plurality of triangular prisms 102 having nanoscale dimensions. The triangular prisms are disposed atop rectangular prisms 124. The polymeric sheet has a second pattern that includes an array of planoconcave lenses 126, rather than Fresnel lenses.

Figure 5A:
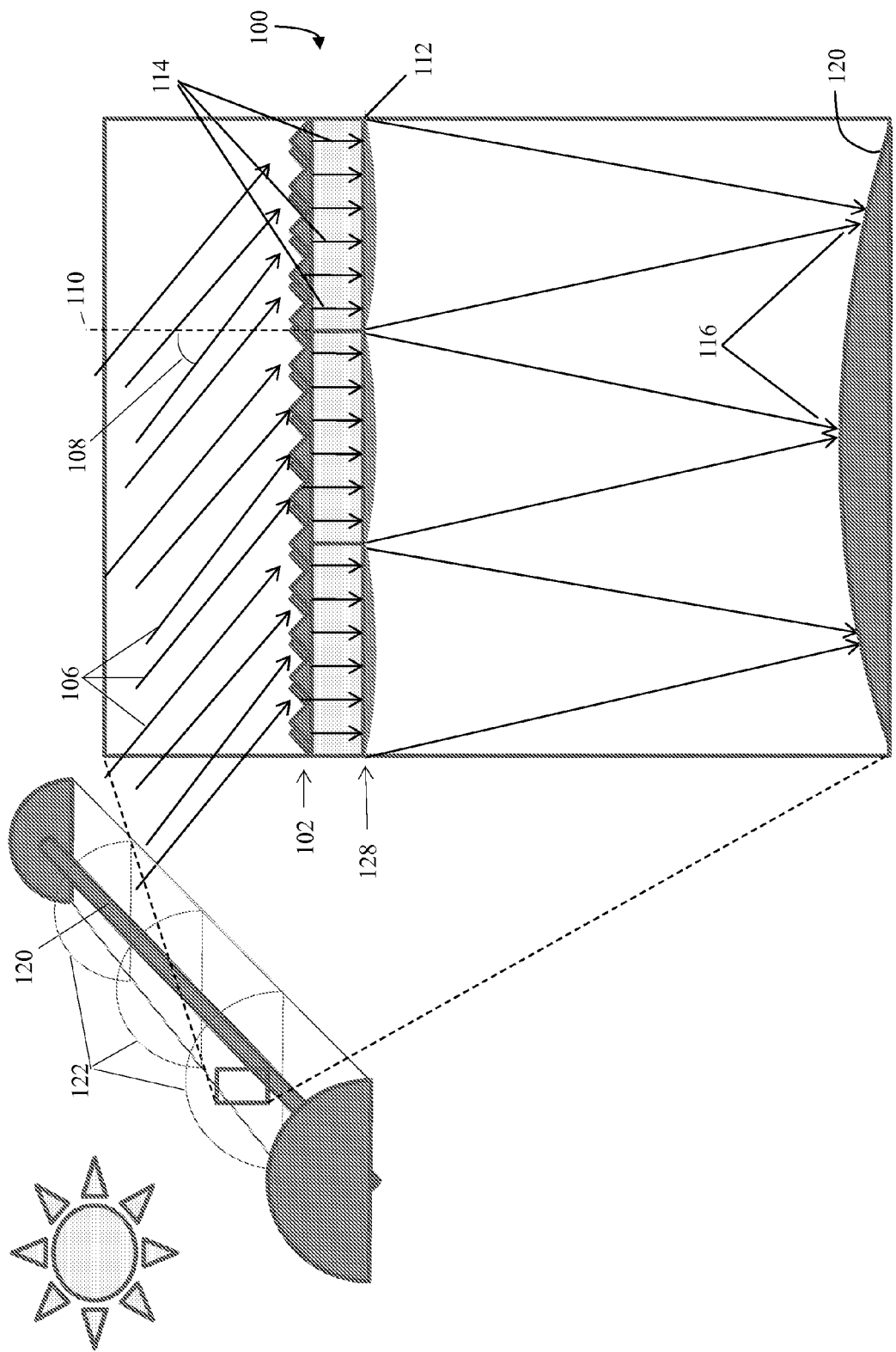
FIGS. 5A-B are schematic diagrams of solar thermal devices incorporating a polymeric solar concentrator (insets) in accordance with this invention.
Figure 5B:
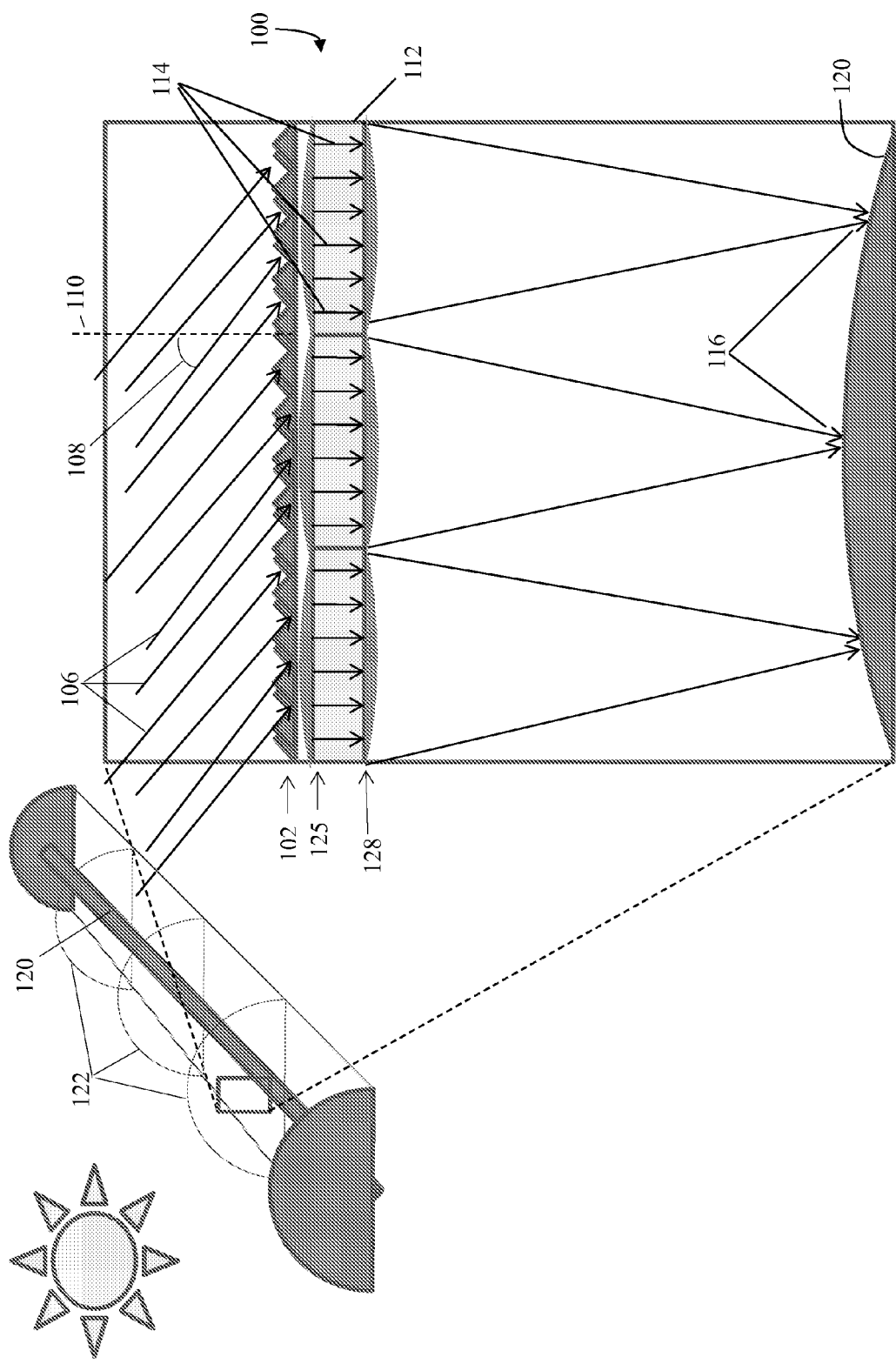

Other embodiments of a polymeric sheet in accordance with this aspect of the invention are shown in the insets of FIGS. 5A-B. The insets show a cross-section of the polymeric sheet 100. In these embodiments, the polymeric sheet includes a first surface with a first pattern comprising a plurality of triangular prisms 102 having nanoscale dimensions. In FIG. 5B, the triangular prisms are disposed atop planoconcave lenses 125. The polymeric sheet has a second pattern that includes an array of planoconvex lenses 128, rather than Fresnel lenses.

Figure 6B:
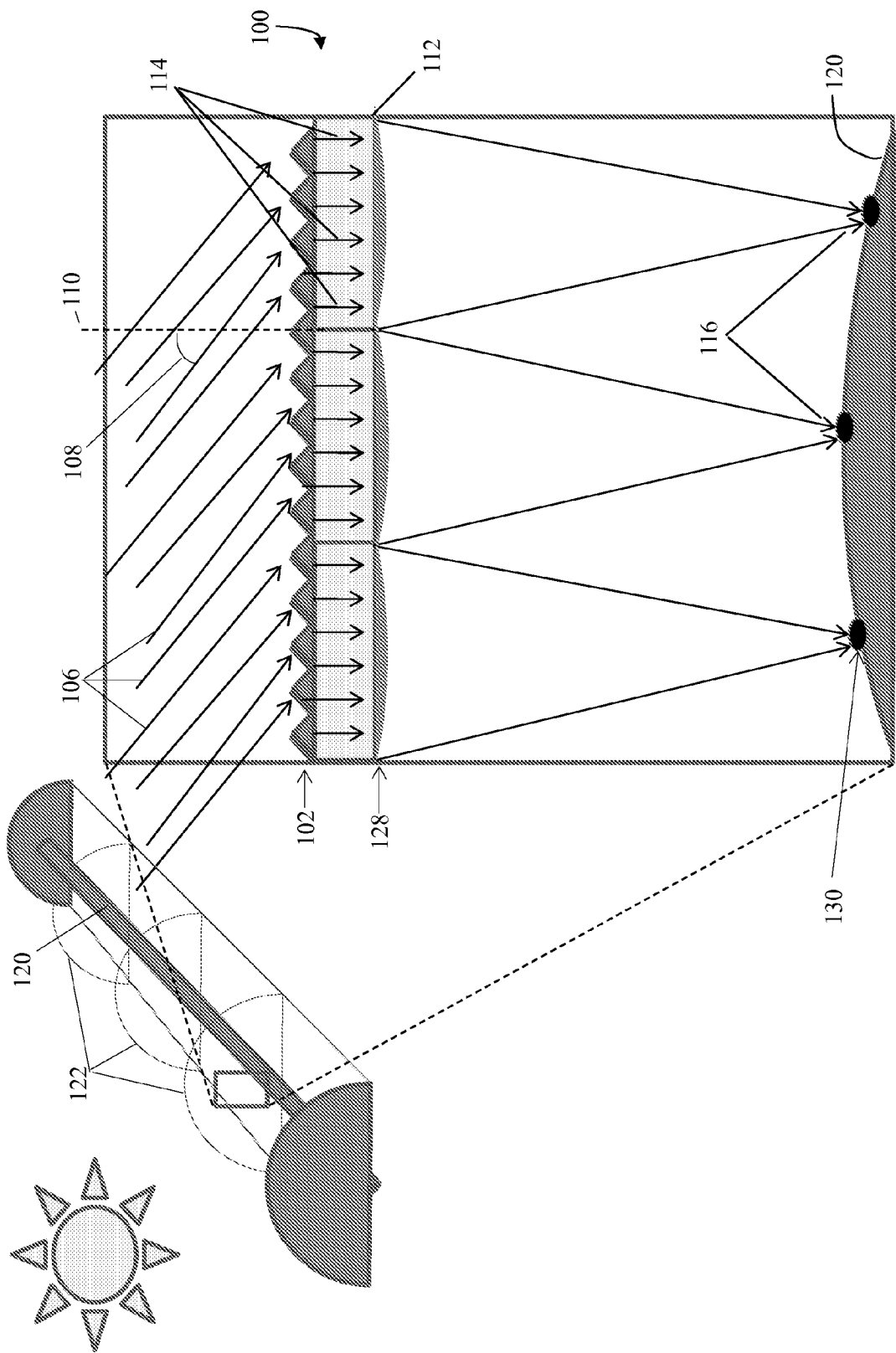
Figure 6C:
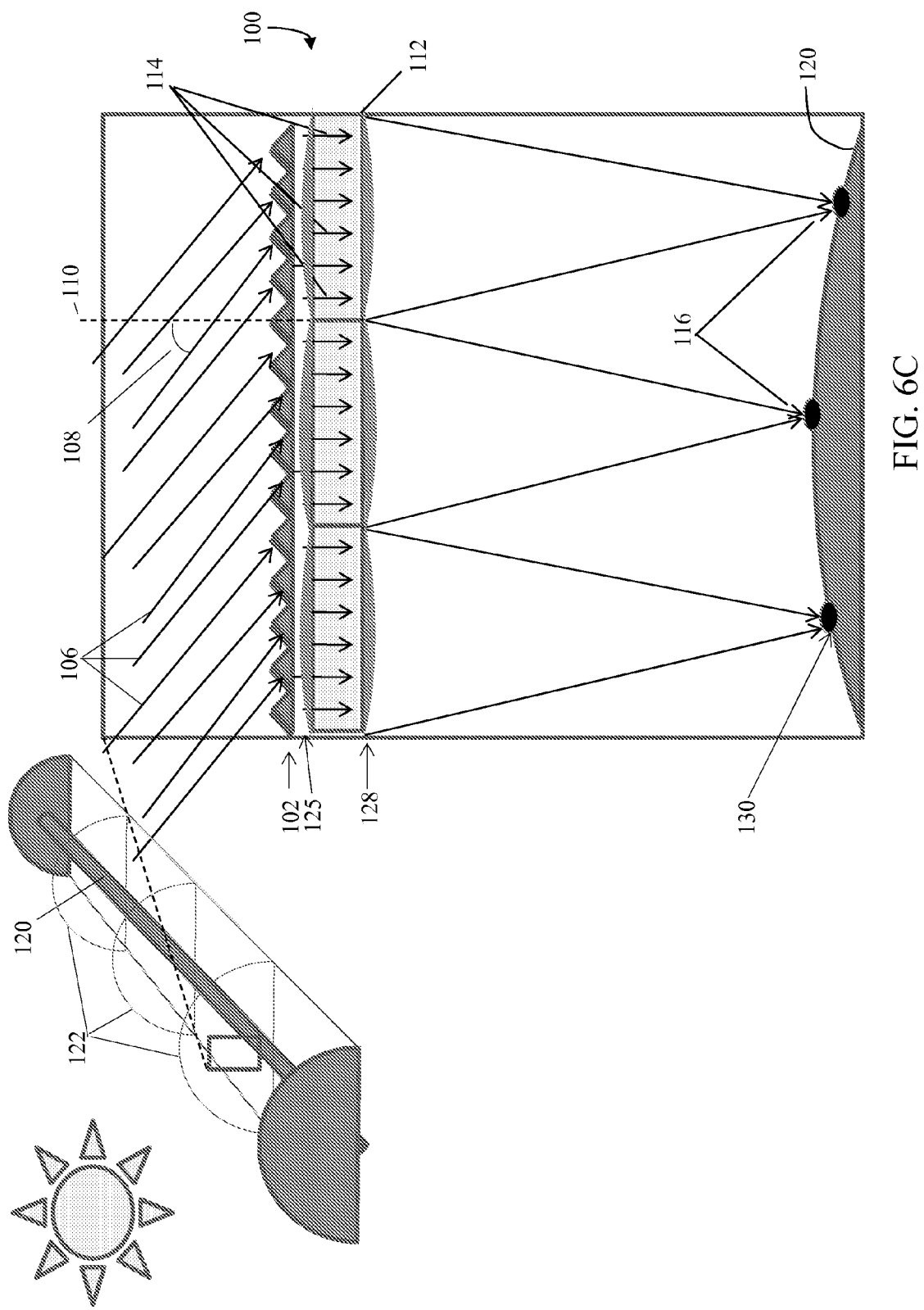

Other embodiments of a polymeric sheet in accordance with this aspect of the invention are shown in the insets of FIGS. 6A-C. The insets show a cross-section of the polymeric sheet 100. In these embodiments, the polymeric sheet includes a first surface with a first pattern comprising a plurality of triangular prisms 102 having nanoscale dimensions. In FIG. 6A, the triangular prisms are disposed atop rectangular prisms 124. In FIG. 6C, the triangular prisms are disposed atop planoconcave lenses 125. The polymeric sheet has a second pattern that includes an array of planoconvex lenses 128, rather than Fresnel lenses.

The range of incident angles which the first pattern is designed to redirect may vary depending on the specific design of the first pattern. By way of illustration only, in some embodiments the range of incident angles which the first pattern is designed to redirect range from at least about −160° to at least about +160°, relative to the surface normal of the polymeric sheet. This includes embodiments in which the range of incident angles which the first pattern is designed to redirect range from at least about −80° to at least about +80°, relative to the surface normal of the polymeric sheet, and further includes embodiments in which the range of incident angles which the first pattern is designed to redirect range from at least about −60° to at least about +60°, relative to the surface normal of the polymeric sheet. The range of transmittance angles into which the incident photons are redirected will also depend on the specific design of the first pattern. By way of illustration only, in some embodiments the range of transmission angles into which the first pattern is designed to redirect photons range from no greater than −5° to no greater than +5°, relative to the surface normal of the polymeric sheet. This includes embodiments in which the range of transmittance angles into which the first pattern is designed to redirect photons range from no greater than −1° to no greater than +1°, relative to the surface normal of the polymeric sheet, and further includes embodiments in which the range of transmittance angles into which the first pattern is designed to redirect photons range from no greater than −0.1° to no greater than +0.1°, relative to the surface normal of the polymeric sheet.

The polymeric sheet may be substantially planar or may be curved in one or more directions along a surface of the polymeric sheet. Curved polymeric sheets may comprise substantially spherical surfaces, in which case the first surface and the second surface each may be characterized by a single radius of curvature. Alternatively, curved polymeric sheets may comprise non-spherical surfaces, in which case the first surface and the second surface may each be characterized by two or more radii of curvature. In some embodiments, a curved polymeric sheet is characterized by an arc-shaped cross-section, the cross-section taken along a plane perpendicular to a surface of the polymeric sheet. In other embodiments, a curved polymeric sheet is characterized by a parabolic-shaped cross-section or a semicircular-shaped cross-section, the cross-sections taken along a plane perpendicular to a surface of the polymeric sheet. Characterization of the polymeric sheet as a "substantially planar polymeric sheet" or a "curved polymeric sheet" refers to a polymeric sheet that is unsupported by any separate structural element in contact with the polymeric sheet except, possibly, a planar substrate upon which the polymeric sheet is set. Thus, a substantially planar polymeric sheet or a curved polymeric sheet can refer to the shape of the unsupported polymeric sheet when it is set upon a planar substrate.

Figure 7A:
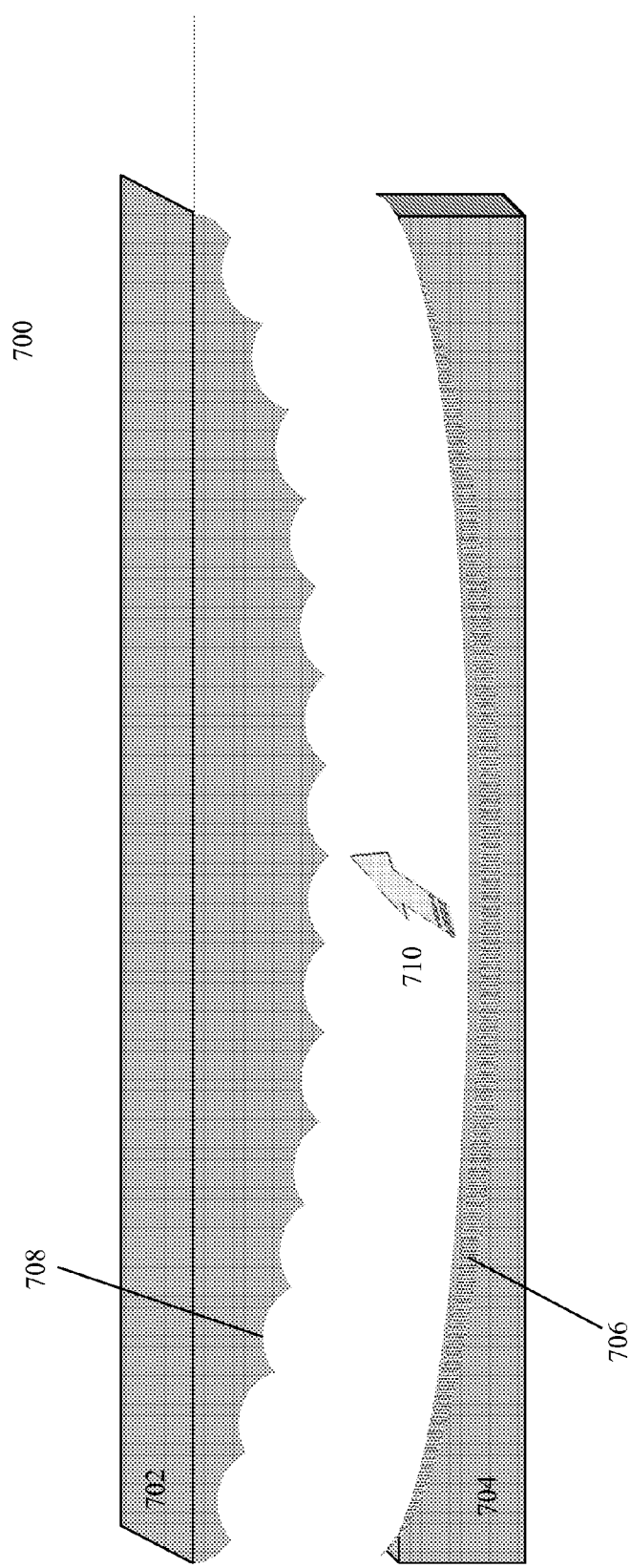
FIG. 7A is a schematic diagram of a die set that can be used to form a curved polymeric sheet in accordance with this invention.
Figure 7B:
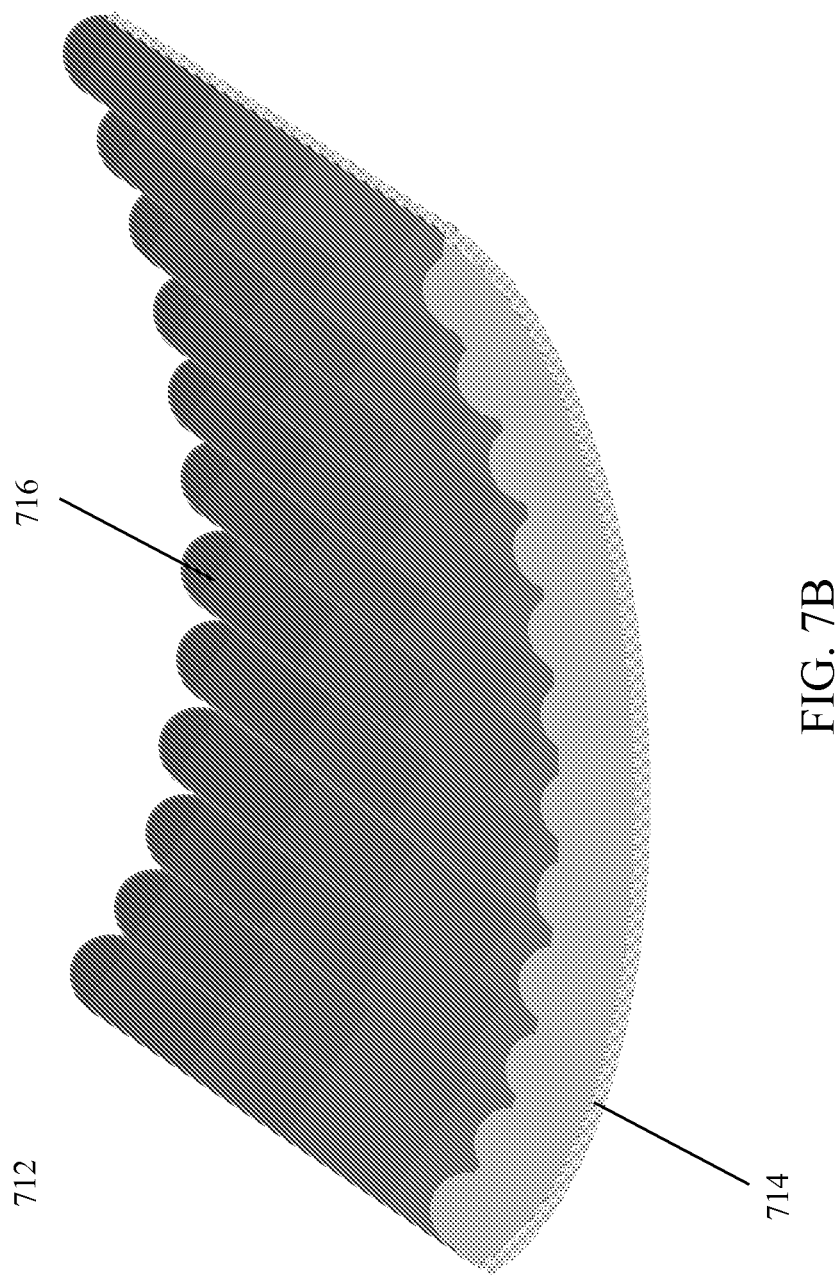
FIG. 7B is a schematic diagram of a curved polymeric sheet formed using the die set of FIG. 7A.

Curved polymeric sheets may be formed using certain forming tool sets or molds (e.g., dies) in the extrusion methods described below. Injection molding, roll to roll embossing and hot embossing methods are also possible. These tools or molds as well as the process desirably assure both low stress in the polymer and a highly even crystalline structure across the cross-section of the polymer. This preserves the durability of the polymeric material and any patterns defined therein and insures optimal and/or even transmission of light (i.e., reduction of light scattering). A cross-sectional view of an embodiment of a die set 700 that can be used to form a curved polymeric sheet is shown in FIG. 7. The die set includes a top die 702 and a bottom die 704. The bottom die has a surface 706 configured to define a first pattern in the first surface of the polymeric sheet (e.g., a plurality of projections having nanoscale dimensions, the projections configured in a moth-eye structure). The top die has a surface 708 configured to define a second pattern in the second surface of the polymeric sheet. In this embodiment, the second pattern comprises a plurality of convex lenses. As further discussed in methods, below, the patterned polymeric sheet can be formed by supplying (e.g., extruding) polymer into the space between the dies in the direction indicated by the arrow 710. The resulting polymeric sheet will be curved due to the cambers (arcs) formed in the dies. A perspective view of an embodiment of a polymeric sheet formed using the die set of FIG. 7A is shown in FIG. 7B. The polymeric sheet 712 is curved and is characterized by an arc-shaped cross-section, the cross-section taken along a plane perpendicular to a surface of the polymeric sheet. The first surface of the curved polymeric sheet has a first pattern 714 defined therein (e.g., a plurality of projections having nanoscale dimensions, the projections configured in a moth-eye structure). The second surface of the curved polymeric sheet has a second pattern 716 defined therein, the second pattern comprising a plurality of convex lenses.

The polymeric sheet may be composed of elements designed to allow the polymeric sheet to be curved in one or more directions along a surface of the polymeric sheet. In some embodiments, the polymeric sheet comprises a plurality of tapered elements separated by grooves, the tapered elements extending from the first surface of the polymeric sheet to the second surface of the polymeric sheet. In some embodiments, the tapered elements are keystone elements. A keystone element is characterized by a trapezoid-shaped cross-section, the cross-section taken along a plane perpendicular to a surface of the polymeric sheet. A perspective view of an edge of an embodiment of a polymeric sheet comprising a plurality of keystone elements, is shown in FIG. 8A. The polymeric sheet 800 includes a first surface 801 having a first pattern comprising a plurality of nanoscale triangular prisms 802 (although any of the first patterns described above are possible). The polymeric sheet 800 further includes a second surface 803 having a second pattern comprising a plurality of planoconvex lenses 804 (although any of the second patterns described above are possible). Keystone elements are indicated by reference numeral 805. The keystone elements are each characterized by a trapezoid-shaped cross-section, the cross-section taken along a plane perpendicular to a surface of the polymeric sheet. A keystone element is further characterized by a thickness Th 807, an outer length OL 808, an inner length IL 809 and a cutting angle A° 810. The keystone elements allow the polymeric sheet to be curved as the edges 814 defined by the cutting angle A° are brought together. This is illustrated in FIG. 8B.

Figure 9:
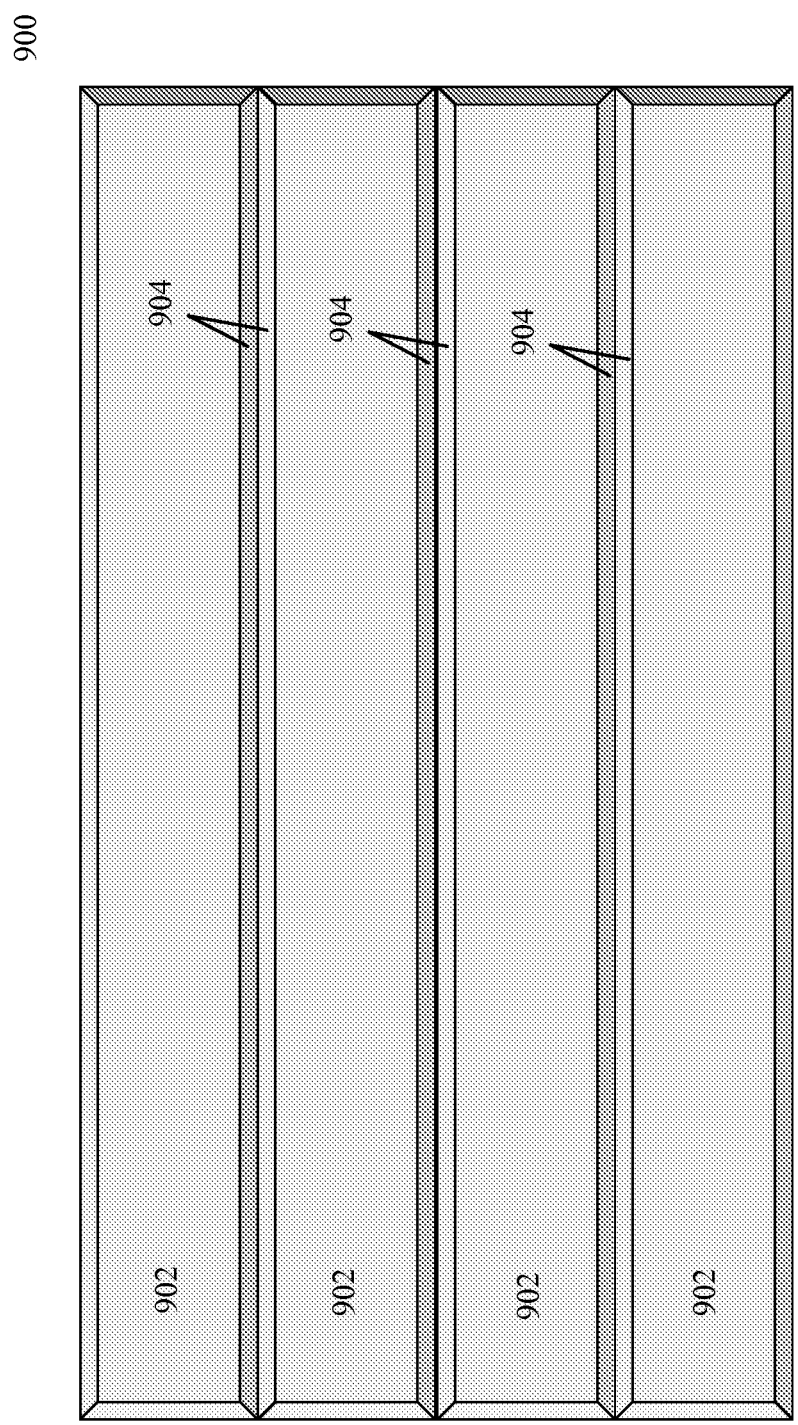
FIG. 9 is a schematic diagram of a polymeric sheet comprising an array of linear keystone elements in accordance with this invention.
Figure 10:
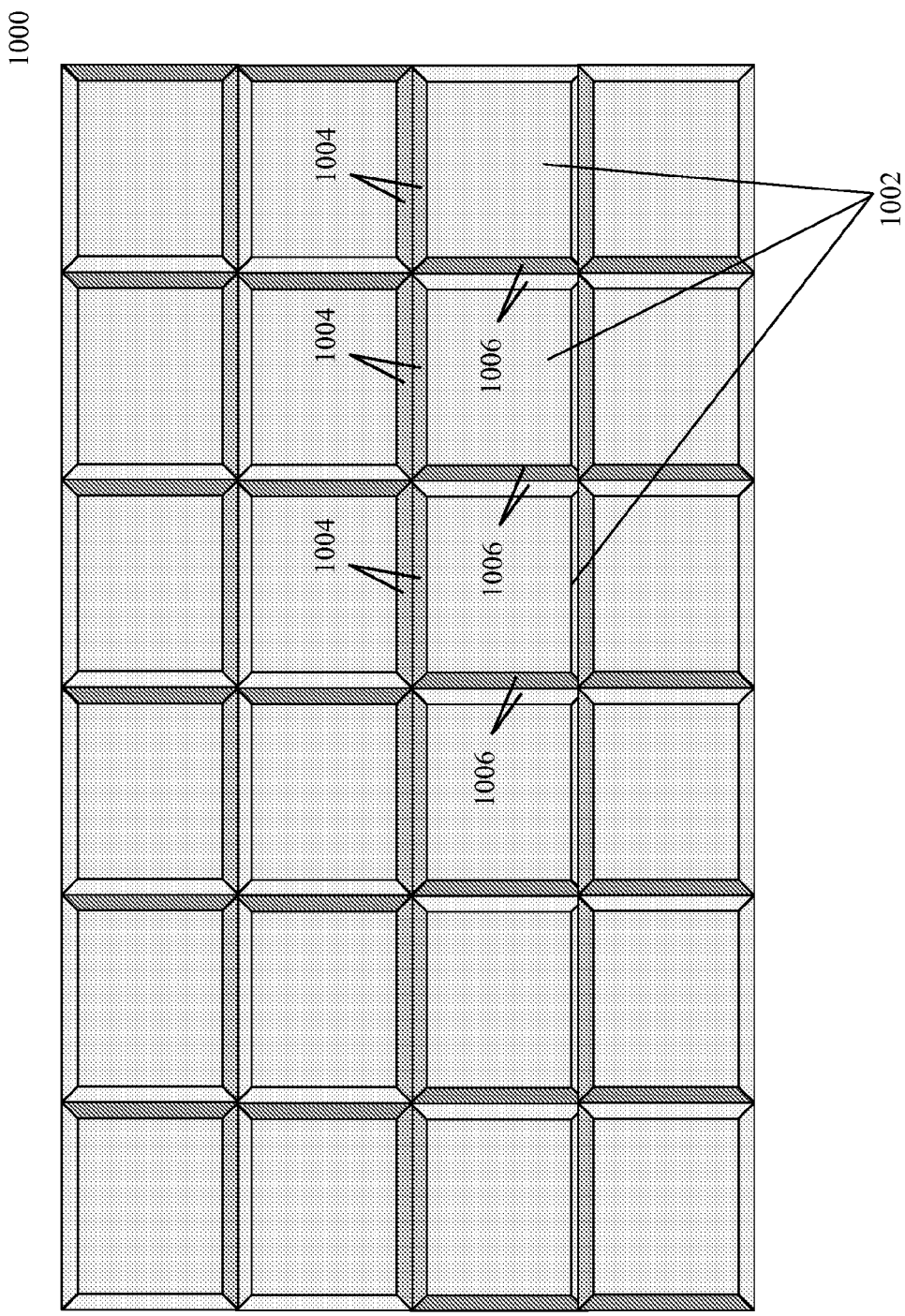
FIG. 10 is a schematic diagram of a polymeric sheet comprising an array of square keystone elements in accordance with this invention.

Referring back to FIG. 8A, the keystone elements 805 extend in a third dimension along a surface of the polymeric sheet 800. As shown in this figure, the width W 816 defines the extension of the keystone elements in this dimension. The footprint of a keystone element on the first surface 801 is determined by the outer length OL 808 and the width W 816. In some embodiments, the footprint of the keystone elements is a rectangle. In some embodiments, the width W is greater than the outer length OL. In other embodiments, the width W extends substantially along the entire length of the polymeric sheet. Such keystone elements may be referred to as "linear keystone elements." As shown in FIG. 9, in some embodiments, the polymeric sheet comprises an array of linear keystone elements. This figure shows a top view of the second surface of a polymeric sheet 900 comprising an array of linear keystone elements 902. The array of linear keystone elements allows the polymeric sheet to be curved in one direction along a surface of the polymeric sheet as the edges 904 defined by the cutting angle A° are brought together. An advantage of linear keystone elements is ease and reduced cost of manufacturing as well as excellent heat distribution in receptacles heated by light concentrated by the polymeric sheet (see, devices below). In other embodiments, the width W is substantially equal to the outer length OL. Such keystone elements may be referred to as "square keystone elements." As shown in FIG. 10, in some embodiments, the polymeric sheet comprises an array of square keystone elements. This figure shows a top view of the second surface of a polymeric sheet 1000 comprising an array of square keystone elements 1002. The array of square keystone elements allows the polymeric sheet to be curved in two directions along a surface of the polymeric sheet as both the edges 1004 defined by the cutting angle A° are brought together and the edges 1006 defined by the cutting angle A° are brought together.

Keystone elements having other footprints on the first surface of the polymeric sheet are possible. By way of illustration only, in some embodiments, the keystone element extends in a third dimension along a surface of the polymeric sheet to form a ring-shaped footprint. Such keystone elements may be referred to as "ring keystone elements." In some embodiments, the polymeric sheet comprises an array of concentric ring keystone elements. Such embodiments can be useful for forming polymeric sheets configured in a semispherical or hemispherical shape.

Other tapered elements are possible, including geodesic elements. Such tapered elements can be useful for forming polymeric sheets configured in a semispherical or hemispherical shape.

The tapered elements, keystone elements and grooves separating the elements can be substantially uniformly-sized in the polymeric sheet, although different sized elements/grooves are possible, e.g., to achieve different amounts of curvature in different areas of the polymeric sheets.

Polymeric sheets can include a mix of patterned areas and unpatterned areas. For example, a polymeric sheet can include areas which do not include the first pattern and/or the second pattern. Such areas of the polymeric sheet would not concentrate, or would be less effective at concentrating, incident light. These unpatterned areas may be useful in providing solar thermal devices with shut-off mechanisms as further described below.

The surfaces of the polymeric sheets can be treated, e.g., with a coating, to alter the physical, optical, chemical, refractive and/or transmission properties of the polymeric sheet. Treatments, e.g., coatings, can increase the durability of the polymeric sheet as well as its resistance to weather.

Devices

Another aspect of the invention provides devices that incorporate polymeric sheets of the type described herein. A variety of devices are possible, including solar thermal devices. One such solar thermal device is shown in FIG. 1. This device includes an elongated receptacle 120 filled with a heat-transfer medium and a polymeric sheet 100 configured in a parabolic curve 122 about the receptacle, wherein the focus of the parabolic curve coincides with a longitudinal axis running through the receptacle. (For simplicity, FIG. 1 shows three cross-sectional segments along the polymeric sheet, with an inset depicting a magnified view of the polymeric sheet and a segment of the receptacle.) For the purposes of this disclosure, a heat-transfer medium may be any gas, liquid, plasma, or solid fiber capable of transmitting heat from one system to another. The heat-transfer medium may include solutions, suspensions, salts, metals, colloids, oils, phase change materials, polymers, crystals, or redox solutions.

When the sheet depicted in FIG. 1 is exposed to sunlight, photons 106 strike the first surface at incident angles 108, measured from surface normal 110, where the surface normal is determined relative to flat plane 112 located just above the second pattern. Throughout the day, the average incident angle 108 will change as the sun crosses the sky, such that the photons are incident upon the first surface over a broad range of angles during the course of the day. These incident photons are redirected 114 by the plurality of nanoscale triangular prisms 102 such that they strike the second surface along a direction parallel to the surface normal of the polymeric sheet (i.e., transmittance angle=0°). As the photons pass through the Fresnel lenses 104 in the second pattern, they are focused into a plurality of focal points 116 on, or in, receptacle 120.

Alternative embodiments of solar thermal devices that incorporate polymeric sheets are shown in FIGS. 2-6. The polymeric sheets 100 in these devices have been described above. In the embodiments shown in FIGS. 2, 3, 5 and 6, the polymeric sheet is configured in a parabolic curve about the receptacles. In the embodiment shown in FIG. 4, the polymeric sheet is configured in a cylinder around receptacle 120, thereby substantially surrounding the receptacle.

Figure 11B:
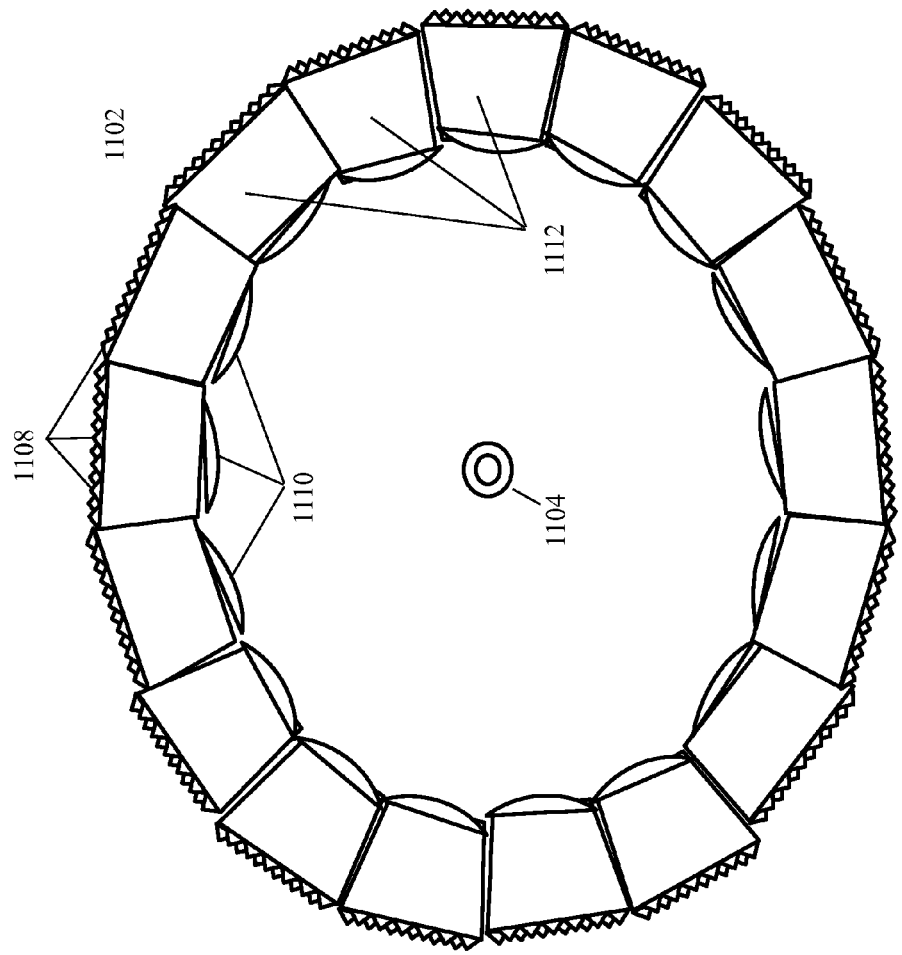
FIG. 11B shows a cross-section of the solar thermal device. The polymeric sheet comprises a plurality of keystone elements and has a plurality of triangular prisms patterned into its first surface and an array of planoconvex lenses patterned into its second surface.
Figure 11A:
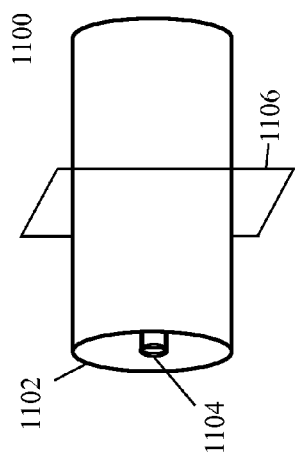
FIG. 11A shows a perspective view of the solar thermal device. The polymeric sheet is configured in a cylinder about a central receptacle.

Yet another embodiment of a solar thermal device that incorporates polymeric sheets is shown in FIG. 11. A schematic of the solar thermal device 1100 is shown in FIG. 11A. The polymeric sheet 1102 is configured in a cylinder around a receptacle 1104 filled with a heat-transfer medium. A cross-section of the solar thermal device taken along the plane 1106 is shown in FIG. 11B. The cross-section shows that the polymeric sheet comprises a first surface having a first pattern defined therein, the first pattern comprising a plurality of triangular prisms 1108 having nanoscale dimensions (although any of the first patterns described herein are possible). The polymeric sheet further comprises a second surface having a second pattern defined therein, the second pattern comprising an array of planoconvex lenses 1110 (although any of the second patterns described herein are possible). The polymeric sheet further comprises a plurality of keystone elements 1112. The focus of the planoconvex lenses coincides with a longitudinal axis running through the receptacle 1104.

Figure 12A:
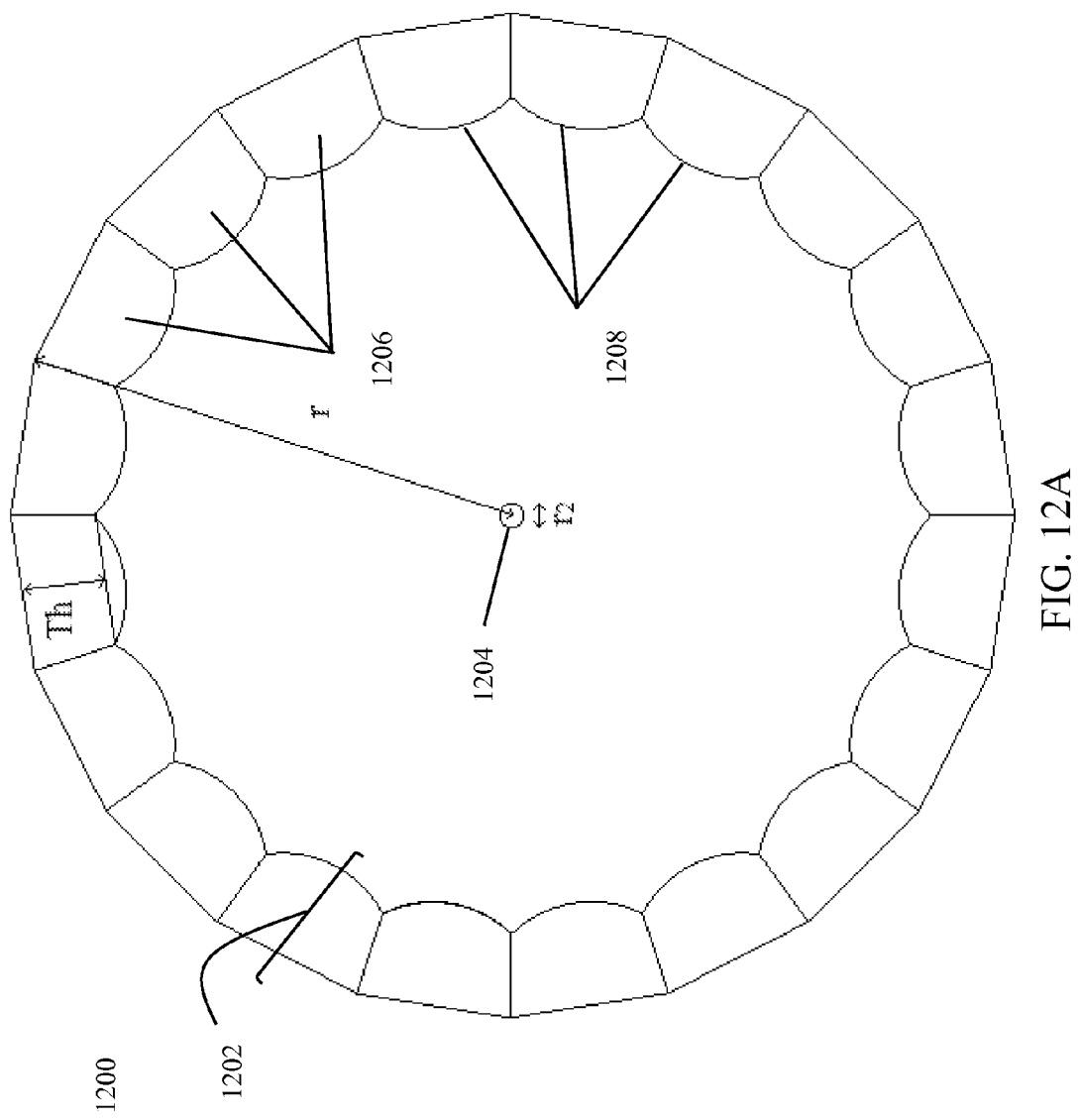
FIG. 12A shows a cross-section of the solar thermal device. The polymeric sheet comprises a plurality of keystone elements and has an array of planoconvex lenses patterned into its second surface. The polymeric sheet is configured in a cylinder about a central receptacle.
Figure 12B:
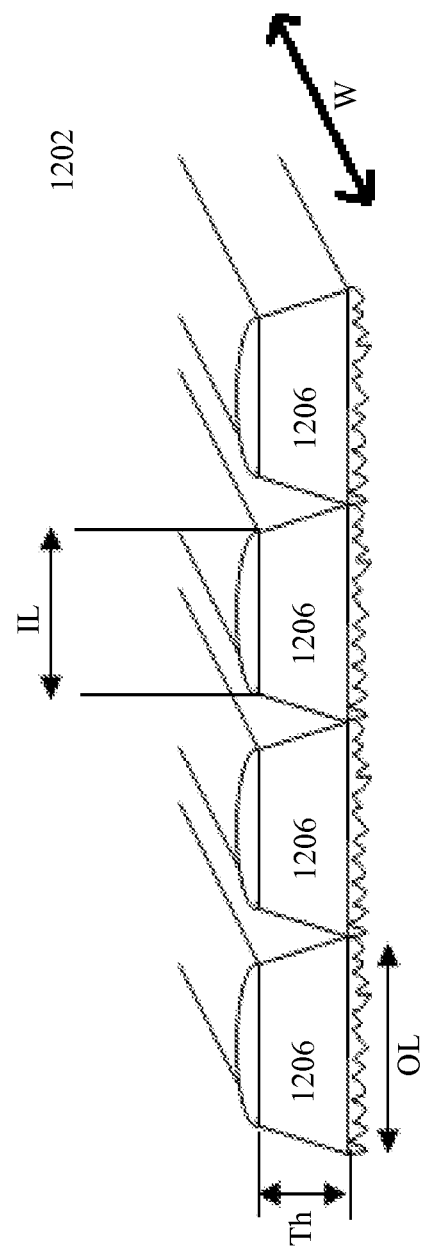
FIG. 12B shows a perspective view of a cross-section of the polymeric sheet.
Figure 12C:
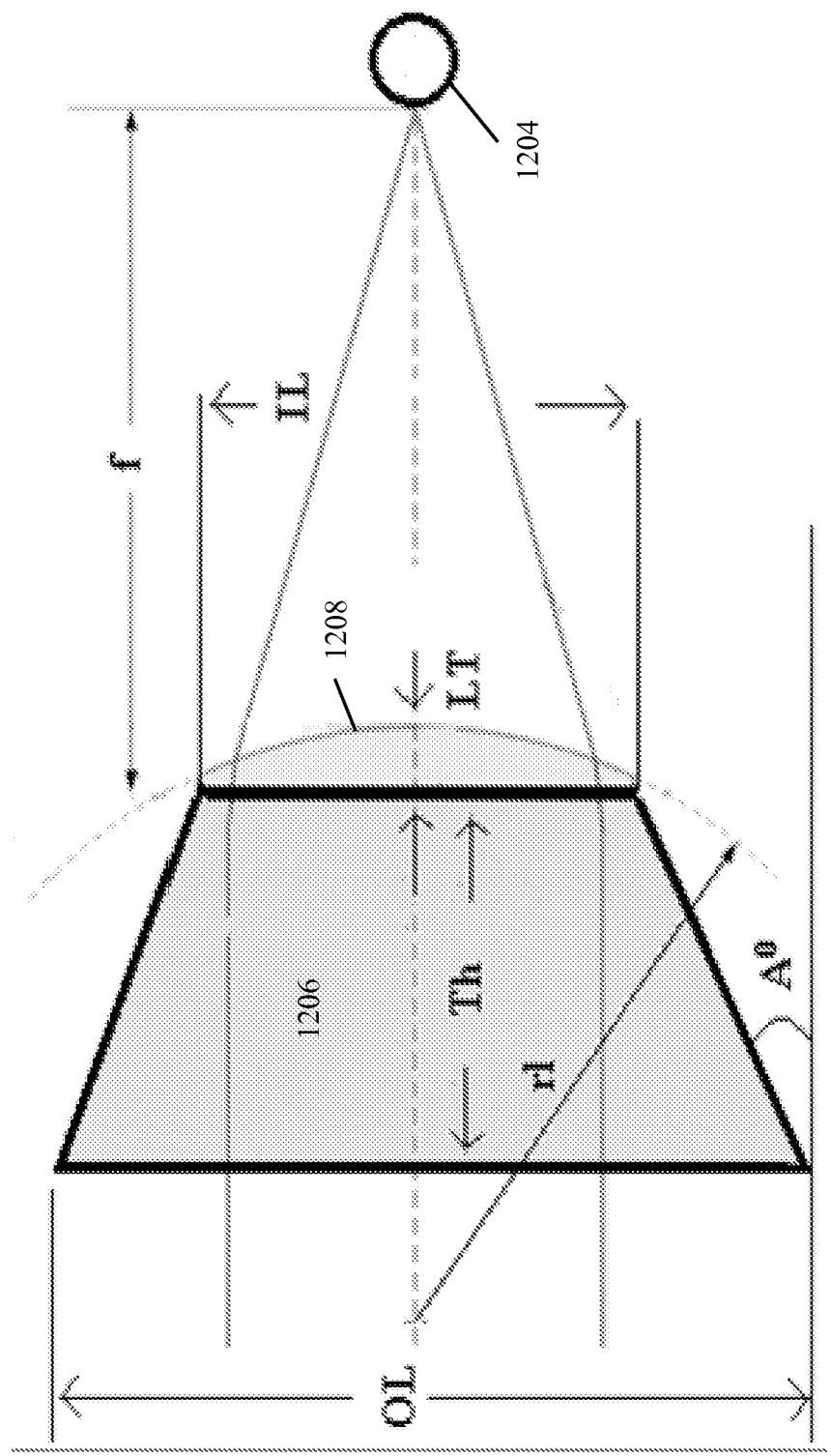
FIG. 12C shows a cross-section of a keystone element having a planoconvex lens disposed thereon.

The following description sets forth equations for determining optimal designs of the keystone elements and the lenses for solar thermal devices of the type shown in FIG. 11. These equations make reference to FIGS. 12A-C. FIG. 12A shows a cross-section of a solar thermal device 1200 comprising a polymeric sheet 1202 configured in a cylinder about a receptacle 1204 filled with heat-transfer medium. The polymeric sheet comprises a plurality of keystone elements 1206 and a second surface patterned with planoconvex lenses 1208 (the first pattern defined in the first surface is not shown). The parameter r is the radius of the device. The parameter r2 is the radius of the receptacle filled with a heat-transfer medium. The parameter Th is the thickness of a keystone element. FIG. 12B shows the polymeric sheet 1202 in greater detail and identifies the following parameters for the keystone elements 1206: the thickness Th, the outer length OL, the inner length IL, and the width W. FIG. 12C shows a single keystone element 1206 and a planoconvex lens 1208 disposed thereon in greater detail. The figure identifies another parameter for the keystone element, the cutting angle A°, and the following parameters for the planoconvex lens: the lens focal length f, the lens thickness LT and the lens radius of curvature rl.

Depending upon a number of input parameters, including the radius of the device r, the number of keystone elements n, the thickness of a keystone element Th, the width of a keystone element W, the refractive index R1 of the material making up the polymeric sheet, and the radius r2 of the receptacle filled with heat-transfer medium, Equations 1-8, below, can be used to determine optimal designs for the keystone element and lenses. These input parameters, as well as the optimal designs, are driven by the application, power needs of the device, and/or cost considerations.

The outer length OL of a keystone element can be determined from Equation 1.

$$OL = 2r\sin\left(\frac{\pi}{n}\right) \quad \text{Equation 1}$$

The inner length IL of a keystone element can be determined from Equation 2.

$$IL = OL - 2\left(\frac{Th}{\text{Tan}(90 - A°)}\right) \quad \text{Equation 2}$$

The cutting angle A° of a keystone element can be determined from Equation 3.

$$A° = 360/(2n) \quad \text{Equation 3}$$

The focal length f of the planoconvex lens can be determined from Equation 4.

$$f = (r - r2) - Th \quad \text{Equation 4}$$

The radius of curvature rl of the planoconvex lens can be determined from Equation 5.

$$rl = f(RI - 1) \quad \text{Equation 5}$$

The thickness of the planoconvex lens can be determined from Equation 6.

$$LT = rl - (\sqrt{rl^2 - IL^2}) \quad \text{Equation 6}$$

The surface area of the solar thermal device exposed may be determined from Equation 7.

$$S = n2r\sin\left(\frac{\pi}{n}\right)W \quad \text{Equation 7}$$

The volume of material required for the polymeric sheet may be determined from Equation 8.

$$V = S*(Th + LT) \quad \text{Equation 8}$$

The material cost may be determined from the volume of material, the density of the material and the material's cost per unit mass. From the sunlight incidence power, the surface area of the solar thermal device exposed (Equation 7) and the geometry and material properties of the receptacle filled with heat-transfer medium, the temperature increase of the receptacle as a function of time can be calculated.

Similar equations can be derived for other lenses, for other polymeric sheets with or without keystone elements, and for other configurations of solar thermal devices using known principles of geometry and optics.

A variety of receptacles may be used in the solar thermal devices. The shape of the receptacle is not particularly limiting. A possible shape is a tube. Receptacles may have surface treatment to increase the thermal conductivity or non-reflection/retention of energy. Examples of the surface treatment include, but are not limited to, thermal/light/corrosion resistance, increased surface area at the micro millimeter scale, fins, ribs, crevasses, hairs, fibers, holes, wells, coatings of highly conductive metals, oxides, ceramics, paints or light absorbing, frequency converting or the color used (e.g. black), or any combination of the above and/or any other known surface treatment. The inner surface of the receptacle may have surface modification to provide maximum energy transfer, specific flow characteristics (e.g. turbulence or laminar), thermal/light/corrosion resistance, increased surface areas at the micro millimeter scale, fins, ribs, crevasses, hairs, fibers, holes, wells, coatings of highly conductive metals, oxides, ceramics, paints or light absorbing, frequency converting or the color used (e.g. black), or any combination of the above and/or any other surface modification known.

In the solar thermal devices, the configuration of the polymeric sheet with respect to the receptacle may vary. In some embodiments, the polymeric sheet is configured in a curve or a curved shape about at least a portion of the surface of the receptacle. A variety of curves or curved shapes are possible, including, but not limited to, parabolic, semicircular, semispherical, hemispherical or spherical. In some embodiments, the polymeric sheet is substantially planar and is configured over at least a portion of the surface of the receptacle.

A variety of other components can be included in the present solar thermal devices. By way of illustration only, the solar thermal device may include a reflector configured and positioned to reflect sunlight onto an area of the polymeric sheet not directly exposed to sunlight. This may be useful for solar thermal devices in which the polymeric sheet is configured in a cylinder around the receptacle filled with a heat-transfer medium. A reflector can be configured and positioned to reflect sunlight onto the polymeric sheet of the underside of the solar thermal device not directly exposed to sunlight. As another non-limiting example, the solar thermal device may include a mechanism configured to rotate the solar thermal device about its longitudinal axis. This may also be useful for solar thermal devices in which the polymeric sheet is configured in a cylinder around the receptacle filled with a heat-transfer medium. As discussed above, the polymeric sheet of the underside of the solar thermal device could be unpatterned or coated such that the unpatterned or coated area reflects, does not concentrate, or is less efficient at concentrating, sunlight. Rotation of the solar thermal device to expose the underside of the solar thermal device to sunlight serves as a way of turning "off" the solar thermal device.

The present solar thermal devices may include a support structure configured to maintain the polymeric sheet in the appropriate form about the receptacle filled with a heat-transfer medium. In one embodiment, the support structure is a frame adapted to engage and retain the polymeric sheet to form a rigid cylindrical or parabolic shape. Frames are spaced at regular intervals along the polymeric sheet to prevent the sheet from sagging upon heating. The frame may also include a plurality of tabs configured to engage matching slots in the polymeric sheet.

Other components typically used in conventional solar thermal devices may be also included in the present solar thermal devices. By way of illustration only, the present solar thermal devices can include a heat-transfer medium source in communication with the receptacle and a pump configured to circulate a heat-transfer medium through the receptacle.

The types of devices in which the polymeric sheets may be incorporated is not limited to solar thermal devices. In general, any device which can make use of concentrated light is possible. Such devices include those which can make use of concentrated light directly (e.g., instead of using the concentrated light to generate heat). In such devices, the receptacle could include a fiber optic cable capable of transmitting light from one system to another. The surface of the receptacle can be configured to define holes through which focused light may pass. Surfaces of receptacles 120 configured to define holes 130 through which focused light may pass are shown in FIGS. 6B and 6C.

Methods

The first and second patterns in the first and second surfaces of the polymeric sheets using, for example, injection molding, embossing or extrusion. Suitable extrusion apparatus and processes for large-scale, dual-sided, nanoscale patterning of polymer materials are described in PCT patent application publication numbers WO 2007/058548 and WO 2010/041962, the entire disclosures of which are incorporated herein by reference.

WO 2007/058548 describes a sheet-patterning apparatus having an upper forming tool set and a lower forming tool set, which are designed to co-act to provide a co-acting forming tool which carries out dual-sided patterning in a pressure forming region. This pressure forming region is defined by an upper forming surface and a lower forming surface, each of which is designed to impart a pattern into the upper and lower surface, respectively, of a sheet of polymeric material as that sheet is pressed between them. The apparatus may include a temperature control system to heat or cool the polymeric sheet as it passes through the forming region. During operation, the upper and lower forming surfaces move in a machine direction as a sheet of material passes between them under pressure.

When the apparatus of WO 2007/058548 is used to fabricate the present polymeric sheets, one of the upper or lower forming surfaces is configured to emboss the first pattern into the first surface of the sheet and the other of the upper or lower forming surfaces is configured to emboss the second pattern into the second surface of the sheet. The patterned sheet can be formed by supplying (e.g., extruding) a polymeric sheet (which could be comprised of one layer or two or more sub-layers) onto the lower forming surface at any point prior to its entry into the pressure forming region. Pressure can then be created on the sheet by its own expansion or as a result of its entering into the reduced space of the forming region. As the sheet moves through the pressure forming region, the first and second patterns are embossed on its first and second surfaces, respectively.

WO 2010/041962 describes a sheet-patterning method in which a polymeric material at a temperature above its glass transition temperature is continuously flowed onto a first molding surface of a first mold. A second molding surface of a second mold is then applied to the exposed surface of the polymeric material, while the material remains at a temperature above its glass transition temperature. The material is then allowed to transition to a temperature below its glass transition temperature, while it remains between the first and second molding surfaces, resulting in the transfer of the patterns from the first and second molding surfaces into the surfaces of the polymeric sheet. The transition to a temperature below the glass transition temperature can be facilitated by a system for active heat removal. Once this is accomplished, the patterned sheet is removed from between the molding surfaces.

In some embodiments of this method, the polymeric sheet comprises two or more sub-layers. In these embodiments, the sheet can be formed by continuously flowing a first polymeric material at a temperature above its glass transition temperature onto the first molding surface of the first mold; continuously flowing a second polymeric material at a temperature above its glass transition temperature onto the exposed surface of the first polymeric material; and applying a second molding surface of a second mold to the exposed surface of the second polymeric material, while both of the polymeric materials remain at a temperature above their respective glass transition temperatures. The polymeric sheet can also be co-extruded out of a co-extrusion die (i.e., two extruders with a single die head). The polymeric materials are then allowed to transition to a temperature below their respective glass transition temperatures, whereby the two polymeric material sub-layers are bonded together and the patterns from the first and second molding surfaces are transferred into the opposing surfaces of the polymeric sheet.

These methods can be carried out continuously in an apparatus that feeds the polymeric sheet into a forming zone defined between the first and second molds. The first and second molding surfaces can be temperature controlled in order to maintain the polymeric material above its glass transition temperature. In some embodiments, the polymeric material is in the liquid phase when it is fed (e.g., extruded) into the forming zone.

When the apparatus of WO 2010/041962 is used to fabricate the present polymeric sheets, one of the first or second molding surfaces is configured to emboss the first pattern into the first surface of the sheet and the other of the first or second molding surfaces is configured to emboss the second pattern into the second surface of the sheet. The sheet can then be formed by supplying a polymeric material by, for example, extruding the polymeric material above its glass transition temperature onto the first molding surface prior to its advancing into the forming zone. Pressure can then be created on the sheet by its own expansion or as a result of its entering into the reduced space of the forming zone. Once the polymeric material cools to a temperature below it glass transition temperature, the first and second patterns are embossed into its first and second surfaces, respectively.

The extrusion processes used to pattern the polymeric sheets can entail simultaneous patterning of the first and second surfaces of the sheet, whereby the first surface is embossed with optical projections for incident light capture and the second surface is embossed with a lens pattern for light concentration. Alternatively, extrusion can be carried out by patterning one surface at a time. In another process two separate sub-layers (or "sub-sheets") are patterned—one with the optical projections for capturing incident light and the other with the lenses for light concentration. The sub-layers can then be laminated together to provide the patterned polymeric sheet. Such a method can be useful for forming the polymeric sheet 100 shown in FIGS. 5B and 6C. One sub-layer can be patterned with the planoconcave lenses 125 on one surface and the planoconvex 128 lenses on the opposing surface. Another sub-layer can be patterned with the nanoscale triangular prisms 102. The sub-layers can then be laminated together to provide the patterned polymeric sheet. Injection molding, compression molding or hot embossing can also be used to pattern one or both surfaces.

The polymeric sheets and solar thermal devices will be understood more readily by reference to the following examples, which are provided by way of illustration and are not intended to be limiting.

Examples

Figure 13:
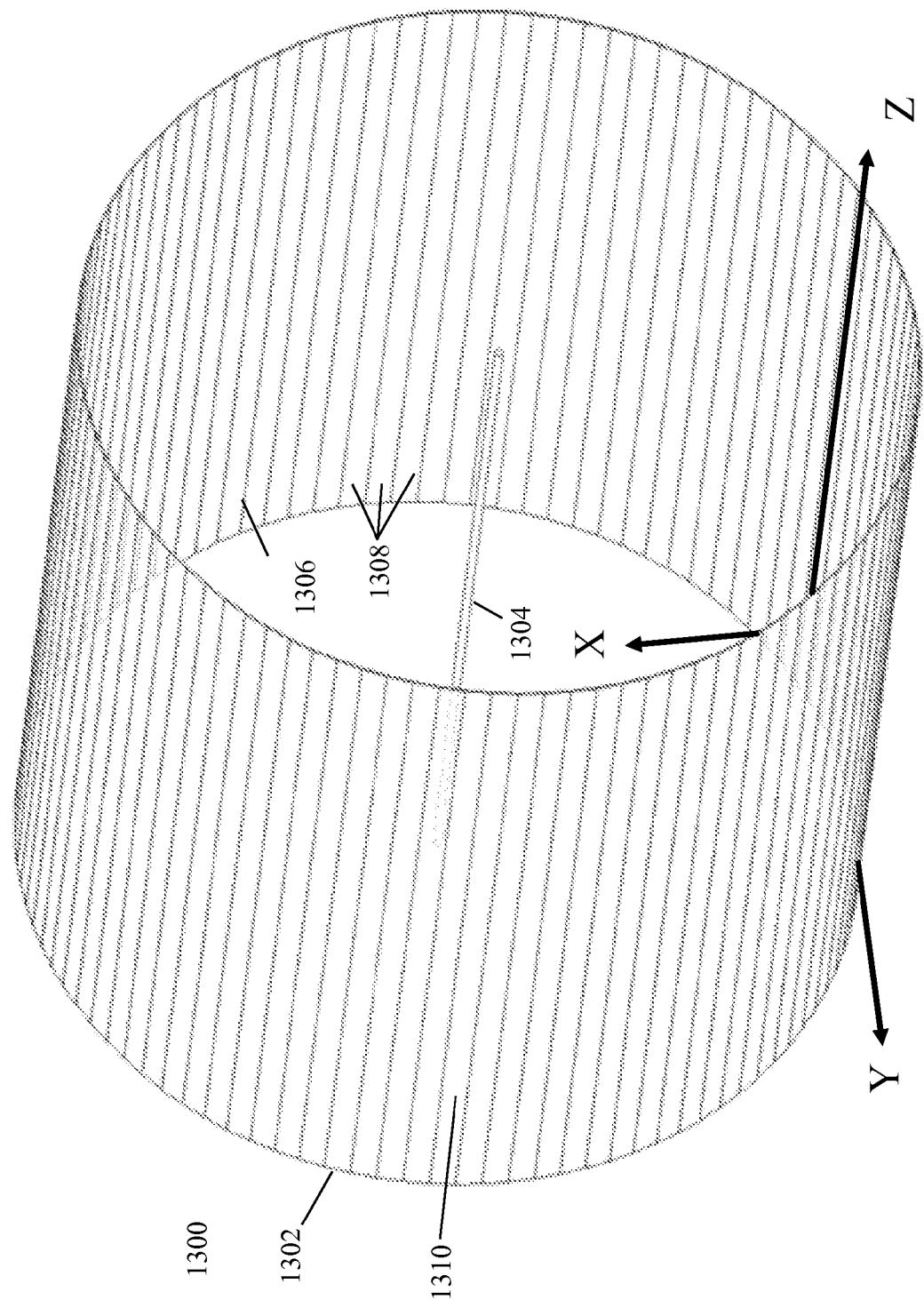
FIG. 13 is a model of a solar thermal device incorporating a polymeric sheet in accordance with this invention. The polymeric sheet comprises an array of linear keystone elements and has an array of planoconvex lenses patterned into its second surface. The polymeric sheet is configured in a cylinder about a central receptacle.

The COMSOL Multiphysics software package and the Zemax ray tracing software package were used to model various solar thermal devices of the type shown in FIG. 13. The solar thermal device 1300 shown in FIG. 13 includes a polymeric sheet 1302 configured in a cylinder about a central receptacle 1304 filled with a heat-transfer medium. The polymeric sheet included an array of one hundred (100) linear keystone elements 1308. The second surface of the polymeric sheet (i.e., the inner surface 1306 of the cylinder formed by the polymeric sheet) was patterned with an array of planoconvex lenses disposed over the linear keystone elements. For purposes of modeling, it was assumed that the first surface of the polymeric sheet (i.e., the outer surface 1310 of the cylinder formed by the polymeric sheet) had a pattern defined therein to redirect photons incident upon the first surface over a broad range of incident angles into orthogonal transmission angles such that the transmitted photons strike the keystone elements of the second surface at perpendicular angles. Other parameters of the solar thermal device 1300 were as follows: r was 50.5 cm; Th was 0.2 cm; W was 100 cm; RI was 1.4914 (the refractive index of PMMA); and r2 was 0.5 cm.

Modeling was also performed for single keystone/lens elements (i.e., a keystone element with a planoconvex lens disposed thereon) to evaluate the spot size of the focal point of a keystone/lens element as a function of the overall size of the keystone/lens element. It was found that the focal spot radius decreases as the overall size of the keystone/lens element decreases (smaller sized keystone/lens elements correspond to a greater number of keystone/lens elements). In addition, the energy distribution in the focal spot narrows as the focal spot radius decreases.

Figure 14:
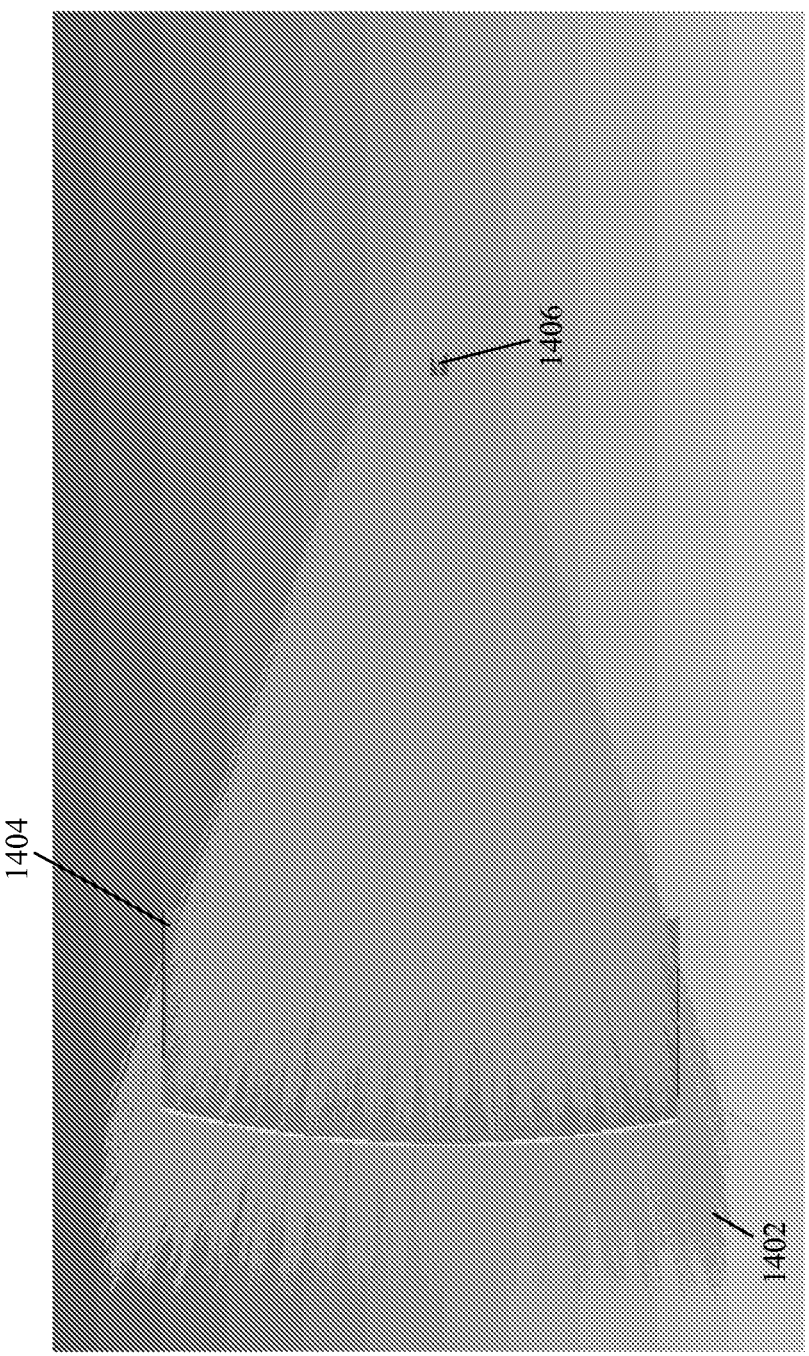
FIG. 14 is a schematic diagram of a portion of the solar thermal device of FIG. 13 in accordance with this invention. The polymeric sheet focuses incident photons evenly along the length of the central receptacle.
Figure 15:
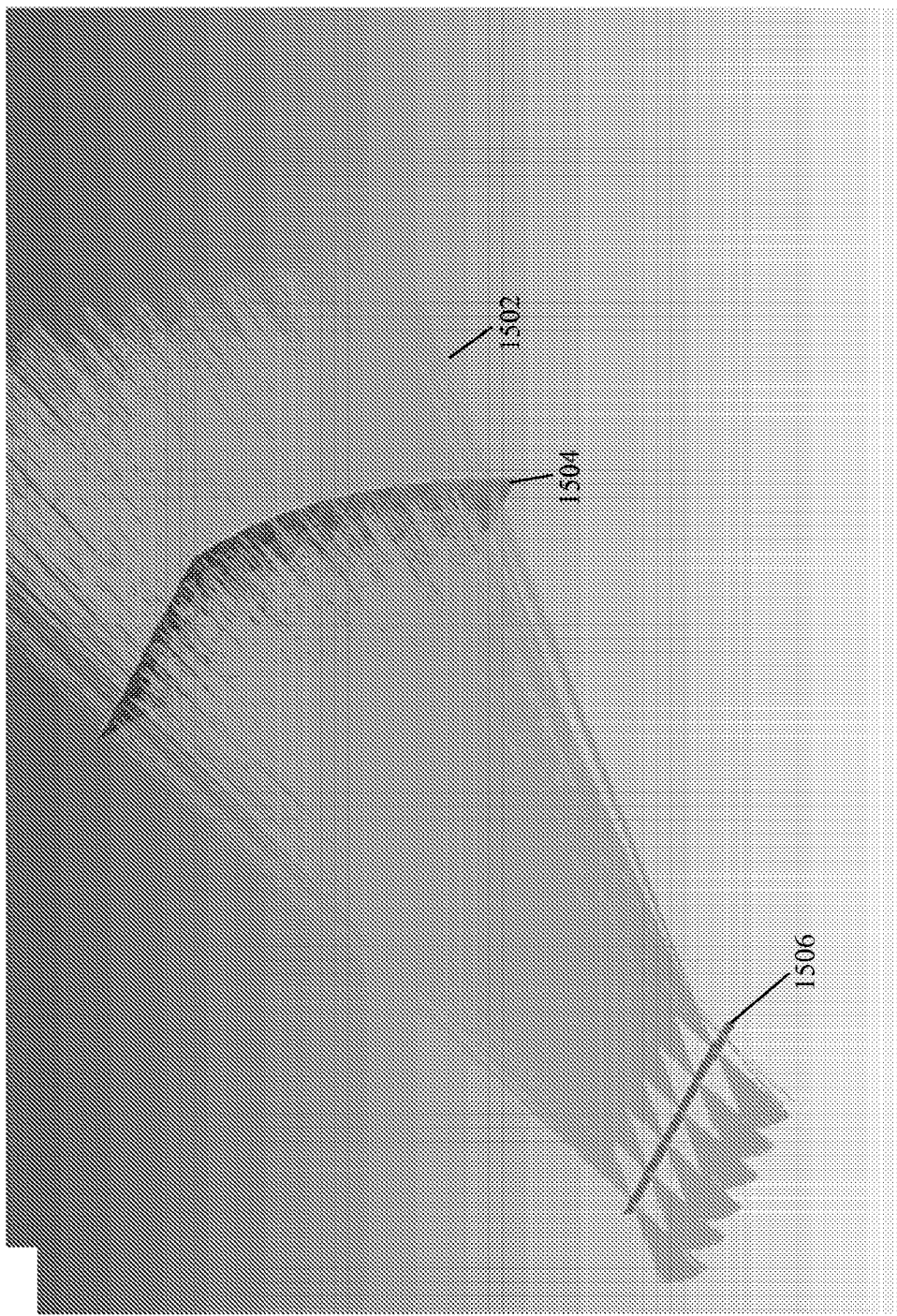
FIG. 15 is a schematic diagram of a portion of a solar thermal device in accordance with this invention. The solar thermal device is similar to the solar thermal device of FIG. 13, except that the polymeric sheet comprises an array of square keystone elements. The polymeric sheet focuses incident photons in discrete spots along the length of the central receptacle.

Modeling was further used to confirm that solar thermal devices of the type shown in FIG. 13 focus incident photons onto the surface of central receptacles filled with heat-transfer medium. FIG. 14 shows a three-dimensional view of a portion (10%) of the solar thermal device 1300 shown in FIG. 13. Photons 1402 striking the keystone elements of the polymeric sheet 1404 at perpendicular angles are focused evenly along the length of the central receptacle 1406. FIG. 15 shows a three-dimensional view of a portion (10%) of a solar thermal device similar to the device of FIG. 13, except that the polymeric sheet included an array of square keystone elements instead of linear keystone elements. Photons 1502 striking the keystone elements of the polymeric sheet 1504 at perpendicular angles are focused in discrete spots distributed evenly along the length of the central receptacle 1506.

Figure 16:
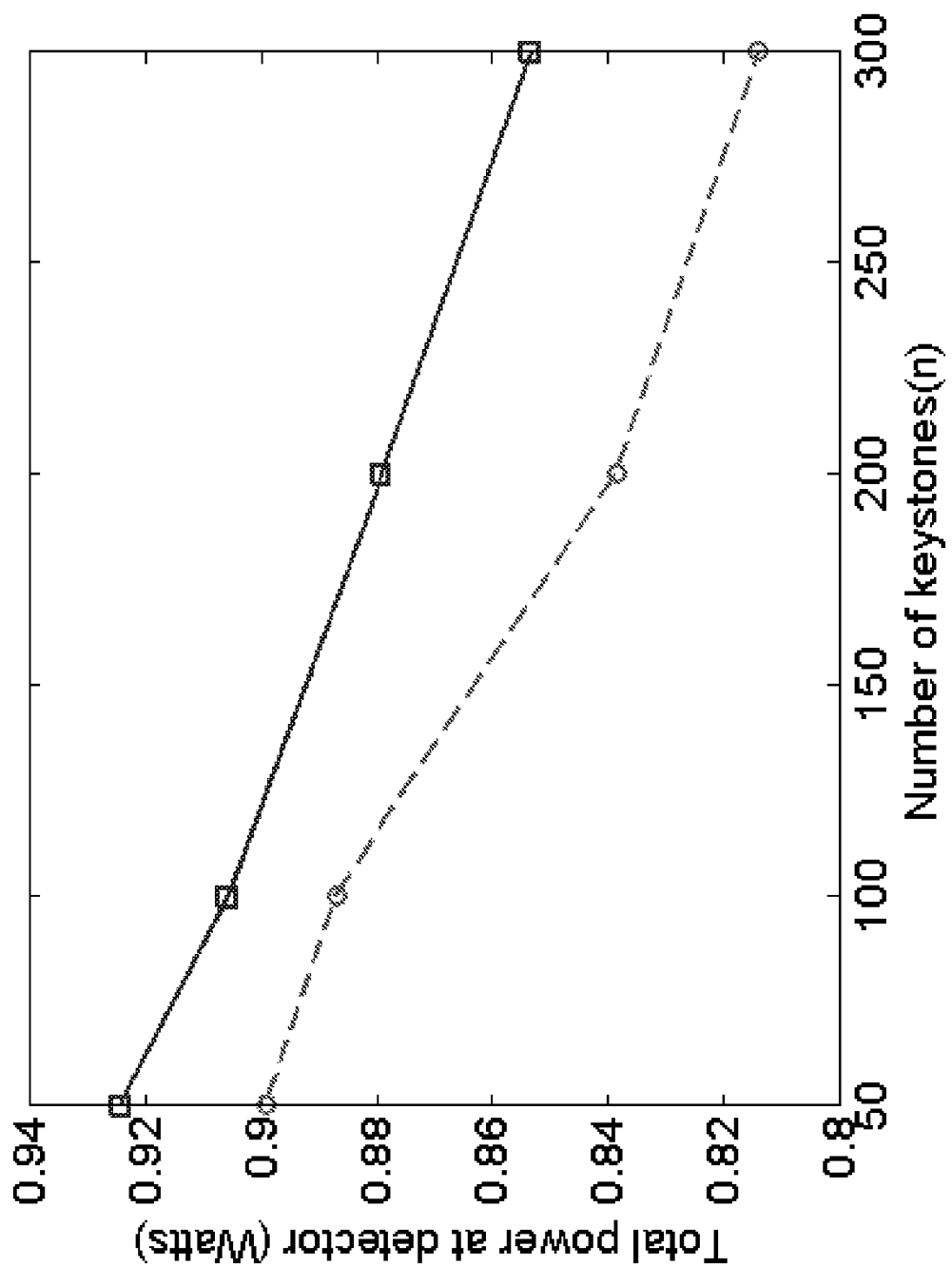
FIG. 16 is a plot of the total power measured at the detector for solar thermal devices of the type shown in FIG. 13 as a function of the number of keystone elements. The squares are the values for solar thermal devices having arrays of linear keystone elements. The circles are the values for solar thermal devices having arrays of square keystone elements.
Figures 17A, 17B:
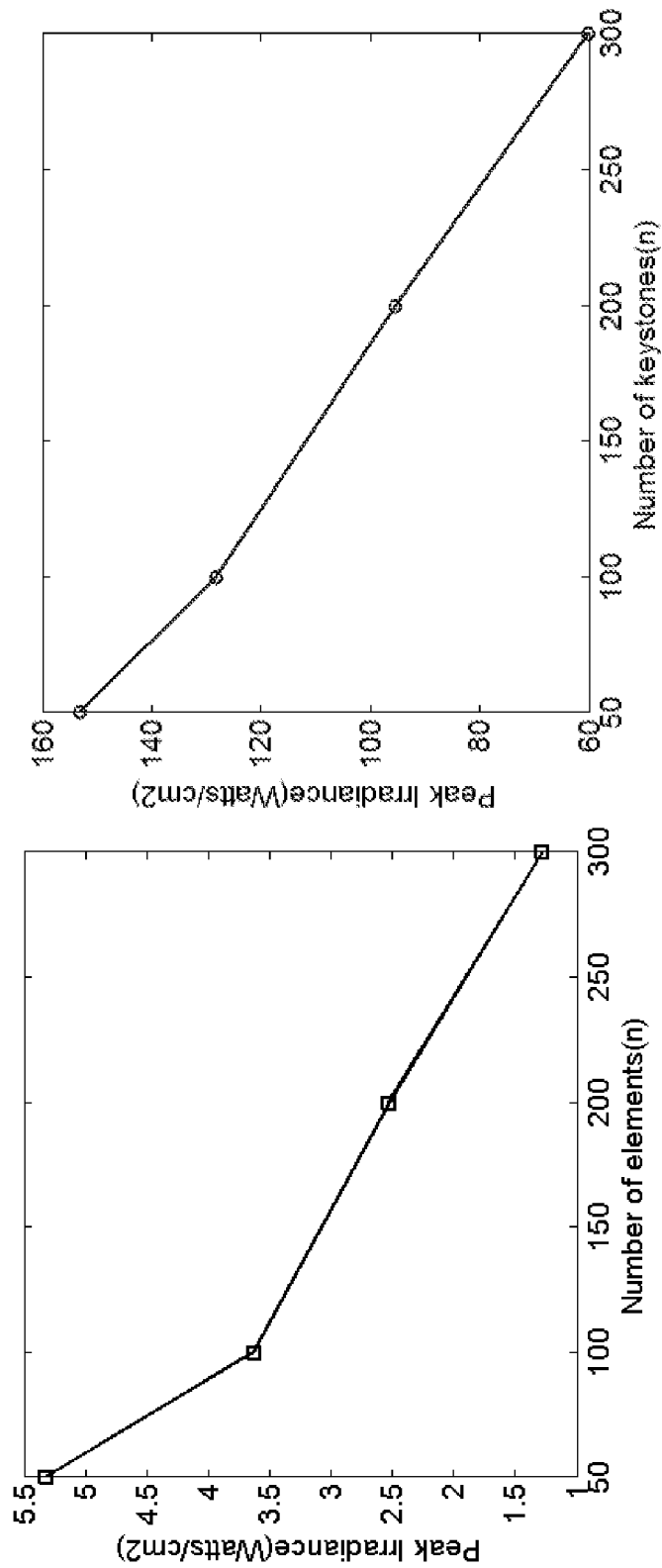
FIG. 17 are plots of the peak irradiance measured at the detector as a function of the number of keystone elements for solar thermal devices of the type shown in FIG. 13, either having an array of linear keystone elements (A) or an array of square keystone elements (B).

Modeling was further used to determine the power, efficiency and peak irradiance achieved by solar thermal devices of the type shown in FIG. 13. For this modeling, 90000 light rays were assigned as input that struck the second surface of the polymeric sheets. A total power of 1 Watt was distributed among these input light rays. For the solar thermal device 1300 of FIG. 13, it was found that the number of light rays striking the detector (i.e., the central receptacle filled with heat-transfer medium) was 81579 with a total power of 0.9 Watts. Thus, the total efficiency of the solar thermal device was found to be about 90%. The peak irradiance at the detector was found to be 3.6 Watts/cm². For an input power of 1 Watt, FIG. 16 plots the total power measured at the detector for solar thermal devices of the type shown in FIG. 13 as a function of the number of keystone elements. The squares are the values for solar thermal devices having arrays of linear keystone elements; the circles are the values for solar thermal devices having arrays of square keystone elements. The plot shows that the total power received at the detector decreases as the number of keystone elements is increased due to losses at the defects (i.e., junctions) between keystone elements. Thus, the losses were more for arrays of square keystone elements due to the larger number of defects (i.e., junctions). FIG. 17 plots the peak irradiance measured at the detector as a function of the number of keystone elements for solar thermal devices of the type shown in FIG. 13, either having an array of linear keystone elements (A) or an array of square keystone elements (B). The plot shows that the solar thermal devices having the array of square keystone elements are able to achieve higher peak irradiances than solar thermal devices having the array of linear keystone elements.

Figure 18:
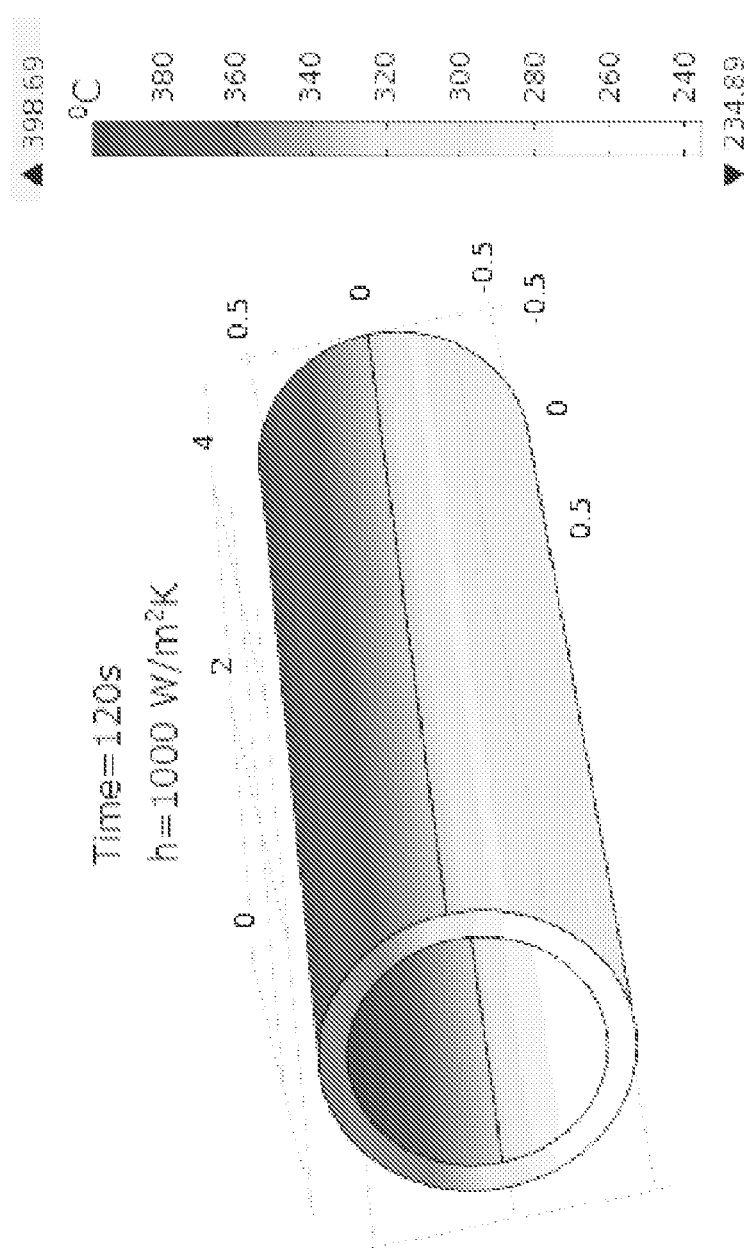
FIG. 18 is a schematic showing the temperature distribution in the central receptacle after 120 s for solar thermal devices of the type shown in FIG. 13, assuming a heat transfer coefficient h of 1000 W/m$^2$K.

Thermal calculations were performed to evaluate the ability of solar thermal devices of the type shown in FIG. 13 to increase the temperature of central receptacles filled with heat-transfer mediums. Knowing the power received from the focused light rays at the central receptacle, the equilibrium temperature of the central receptacle can be calculated. For these calculations, the central receptacle was taken to be made of steel with a solar absorbance of 96% and thermal emittance of 5%. The central receptacle was modeled using COMSOL Multiphysics in a 3D geometry. The outer diameter OD of the central receptacle was 1 cm, the wall thickness was 0.1 cm and the length was 10 cm. Only half of the surface of the central receptacle (i.e. 180° angle) was considered to be exposed to focused sunlight. The heat diffusion equation (Equation 9) was solved for the solid domain to calculate the temperature distribution in the central receptacle.

$$\rho C_p \frac{\partial T}{\partial t} = \nabla \cdot \kappa \nabla T \qquad \text{Equation 9}$$

where T is temperature, $\rho$ is the density of material, $C_p$ is the heat capacity of the material, and $\kappa$ is the thermal conductivity. The inward heat flux (Equation 10) was applied to the surface boundary exposed to focused sunlight $$-\kappa \nabla T = P \qquad \text{Equation 10}$$

where P is the applied power (W/m²) at the boundary, which was determined from the calculations described above. The inner portion of the receptacle was considered to have a convective cooling effect, such as when the molten salt or water is circulated though the central receptacle. Thus for the inner surface area of the central receptacle, a convective heat loss boundary condition (Equation 11) was included as $$-\kappa \nabla T = h(T_{ext} - T) \qquad \text{Equation 11}$$

where $T_{ext}$ is the room temperature and h is the heat transfer co-efficient defined as in Equation 12, $$h = \frac{Q}{A \Delta T} \qquad \text{Equation 12}$$

where Q is the thermal losses and A is surface area, $\Delta T$ is the temperature difference between the steel pipe and the circulating coolant. The value of h depends on phase change energy, density and velocity of the circulation of the circulating medium. All the other boundaries were assumed to have thermal radiation into the atmosphere and were modeled using Equation 13, $$-\kappa \nabla T = \epsilon (T_{ext}^4 - T^4)$$
Equation 13 where ϵ is the thermal emittance coefficient of the material. Room temperature was taken to be 20° C. By solving the diffusion equation in 3D geometry with the above mentioned boundary conditions, the temperature distribution in the central receptacle after 120 s was found as shown in FIG. 18, assuming a heat transfer coefficient h of 1000 W/m²K.

Figure 19:
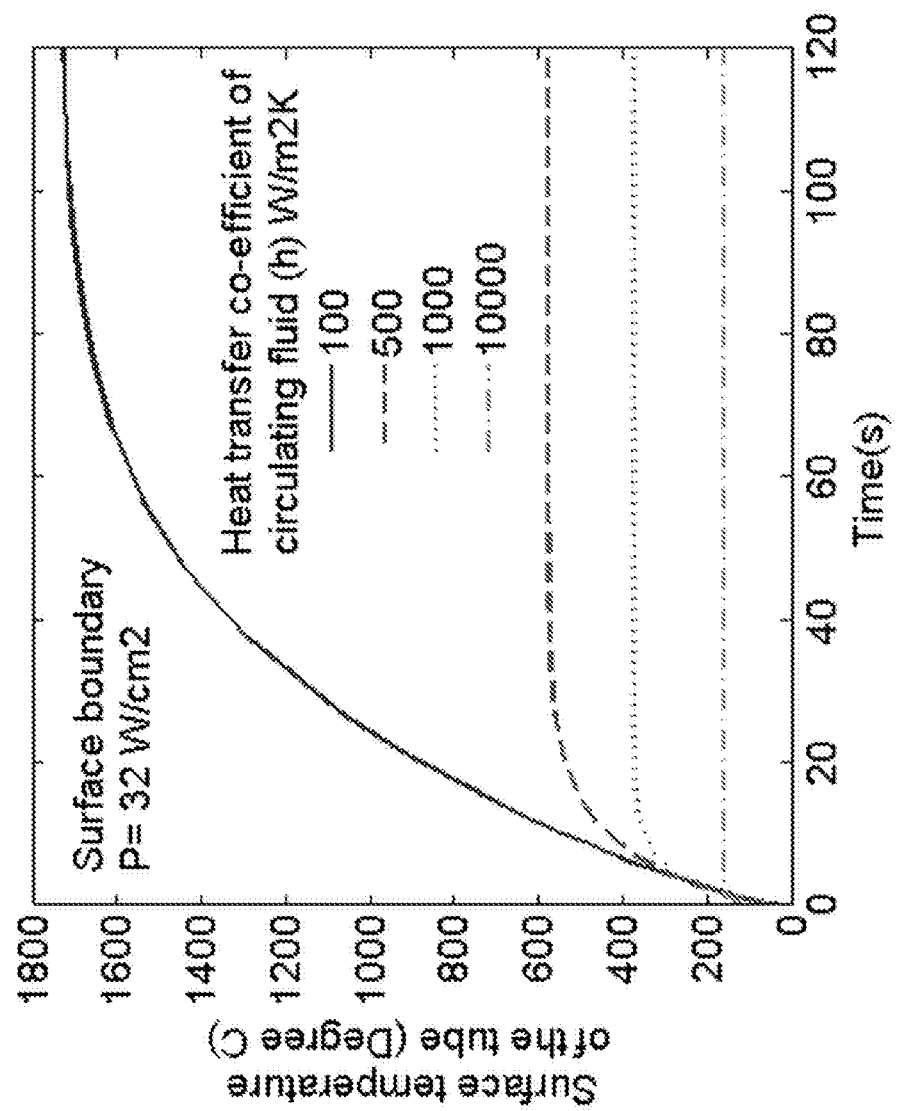
FIG. 19 is a plot of the surface temperature of the central receptacle as a function of time for solar thermal devices of the type shown in FIG. 13, for various values of the heat transfer coefficient h.

As shown in FIG. 19, the value of the heat transfer coefficient h was varied and the temperature variation as a function of time (120 s) was calculated for each heat transfer coefficient. The simulation showed that the surface temperature of the central receptacle increases rapidly until the heat influx matches the heat transfer to the circulating medium and by which time it reaches the equilibrium. The equilibrium receptacle temperature and the rate of increase of the temperature mainly depend on the heat transfer coefficient of the circulating medium. This in turn is determined by the type of circulating medium and its velocity.

In order to calculate the amount of energy that can be collected through the receptacles of solar thermal devices of the type shown in FIG. 13, a 10 cm length section of the solar thermal device was considered. It was assumed that only the upper third of the solar thermal device was exposed to sunlight (i.e., around 120° angle exposure). The total exposed surface area of this section of the solar thermal device (EAD) was determined from Equation 14, $$EAD = 2 * \pi * r * L * \tfrac{1}{3}$$
Equation 14 where r is 50.5 cm and L is 10 cm. Thus, total exposed surface area of the 10 cm length section of the solar thermal device EAD was determined to be 0.1 m². The total exposed surface area of the receptacle EAR was determined from Equation 15, $$EAR = 2 * \pi * r2 * L * \tfrac{1}{3}$$
Equation 15 where r2 is 0.5 cm and L is 10 cm. Thus, the total exposed surface area of the receptacle was determined to be 0.001 m². Assuming that 1000 W/m² of power falls onto the solar thermal device, the total focused power per area on the receptacle was determined to be 100,000 W/m².

In order to calculate the equilibrium temperature the receptacle will reach if 100,000 W/m² of power is focused on it, the heat diffusion convection and radiation equation were modeled as per the calculations set forth above. A third of the receptacle surface was considered as heat flux in with 100,000 W/m². All the other boundaries were considered as insulated boundaries except the inner boundaries of the receptacle which was considered as convective cooling. Silicone oil was considered as the heat-transfer medium flowing through the receptacle at a constant velocity. The temperature of the receptacle increased linearly and reached its equilibrium temperature after few seconds. Plots of the average temperature of the receptacle over time for various velocities of the silicone oil flowing inside the receptacle were obtained. Higher equilibrium temperatures were obtained for slower velocities. A three-dimensional plot of the temperature distribution of the receptacle assuming a heat-transfer medium velocity of 0.05 m/s was obtained.

The average power that can be collected by circulating silicone oil through the receptacle can be determined from the equilibrium temperature of the receptacle and the heat transfer coefficient h as shown in Equation 16, $$Q = h * A * \Delta T$$
Equation 16 where A is surface area and ΔT is the difference between the average temperature of the receptacle and the temperature of the incoming silicone oil. It was assumed that the temperature of the incoming oil was 20° C. A plot of the total power collected by the heat-transfer medium versus the velocity of the heat-transfer medium was obtained. Higher total powers were obtained for slower velocities. It was also determined that for the 10 cm length section of the solar thermal device, about 450 Watts/m² can be extracted. In order to extract 25 million btu/hour (i.e., 7,326,777 Watts), a 16,281 m² surface area in the solar thermal device is needed. This assumes zero light ray losses and zero radiation and convection losses.

A two-dimensional model was also developed for calculating the temperature and velocity of the heat-transfer medium in the receptacle. For this model, the receptacle was a steel tube and the heat-transfer medium was silicone oil. The geometry of the steel tube had a 1 cm diameter, a 10 cm length and a wall thickness of 1 mm. One side of the receptacle was exposed to concentrated sunlight while the other side was insulated. A heat flux of 100,000 W/m² was applied at the boundary. The results showed that depending on the input velocity of the heat-transfer medium, the temperature distribution in both the heat-transfer medium and the receptacle varies. Plots of the temperature and velocity distribution of the heat-transfer medium in the receptacle were determined for input velocities of 0.01 m/s and 1 cm/s. The velocity was higher in the heated side of the receptacle and the temperature of the heat-transfer medium near the boundary increased close to the temperature of the receptacle. Plots showing the average temperature evolution in the receptacle and the heat-transfer medium over time for different input velocities were obtained. The results showed that when the velocity of the heat-transfer medium is increased the average temperature of both the receptacle and the heat-transfer medium decreased.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:
1. A solar thermal device comprising:
a receptacle configured to contain a heat-transfer medium; and
a sheet comprising a polymeric material optically transparent to radiation present in sunlight, the sheet con- figured over at least a portion of the surface of the receptacle, the sheet comprising:
a first uppermost surface defining an entrance interface through which photons initially enter the sheet, the first uppermost surface having a first pattern defined therein, the first pattern configured to redirect photons incident upon the first uppermost surface over a predetermined range of incident angles into a narrower predetermined range of transmittance angles, wherein the incident angles and the transmittance angles are measured with respect to a global surface normal of the sheet, the global surface normal defined with respect to a flat plane extending longitudinally through the sheet, wherein the transmittance angles are more orthogonal with respect to the flat plane than the incident angles; and
a second surface disposed opposite the first uppermost surface and having a second pattern defined therein, the second pattern configured to focus the photons transmitted to the second surface onto the surface of the receptacle,
wherein the first pattern comprises a plurality of projections extending in a direction opposite the second surface,
and further wherein the polymeric material from which the sheet is formed extends from the first uppermost surface to the second surface.

2. The device of claim 1, wherein the first pattern comprises a plurality of projections having nanoscale dimensions.

3. The device of claim 1, wherein the first pattern comprises a plurality of triangular prisms.

4. The device of claim 1, wherein the first pattern comprises a plurality of projections having nanoscale dimensions, the projections configured in a moth-eye structure.

5. The device of claim 1, wherein the second pattern comprises an array of lenses, each lens in the array characterized by a focal length, the array of lenses configured to focus the photons transmitted to the second surface to a plurality of focal points onto the surface of the receptacle.

6. The device of claim 5, wherein the density of lenses on the second surface is at least 1 billion/m$^2$.

7. The device of claim 1, wherein the second pattern comprises an array of planoconvex lenses, each planoconvex lens in the array characterized by a focal length, the array of planoconvex lenses configured to focus the photons transmitted to the second surface to a plurality of focal points onto the surface of the receptacle.

8. The device of claim 1, wherein the predetermined range of incident angles ranges from at least −80° to at least +80°, with respect to the global surface normal of the sheet, and the predetermined range of transmittance angles ranges from no greater than −1° to no greater than +1°, with respect to the global surface normal of the sheet.

9. The device of claim 1, wherein the sheet comprises at least two sub-layers, each of which comprises a polymeric material optically transparent to radiation present in sunlight.

10. The device of claim 1, wherein the sheet comprises a plurality of tapered elements having side edges extending all the way from the first surface of the sheet to the second surface of the sheet, the tapered elements separated by grooves between the side edges of neighboring tapered elements and configured to allow the sheet to be curved in one or more directions along the sheet as the side edges of neighboring tapered elements are brought together.

11. The device of claim 10, wherein the tapered elements are keystone elements.

12. The device of claim 11, wherein the sheet comprises an array of linear keystone elements, the linear keystone elements configured to allow the sheet to be curved in a single direction along the sheet.

13. The device of claim 11, wherein the sheet comprises an array of square keystone elements, the square keystone elements configured to allow the sheet to be curved in two directions along the sheet.

14. The device of claim 11, wherein the first pattern comprises a plurality of projections having nanoscale dimensions, further wherein the second pattern comprises an array of lenses, each lens in the array characterized by a focal length, the array of lenses configured to focus the photons transmitted to the second surface to a plurality of focal points onto the surface of the receptacle and further wherein the sheet comprises an array of linear keystone elements, the linear keystone elements configured to allow the sheet to be curved in a single direction along the sheet.

15. The device of claim 1, wherein the sheet is configured in a parabolic curve or a semicircular curve.

16. The device of claim 1, wherein the sheet is configured in a cylinder substantially surrounding the receptacle.

17. The device of claim 15 further comprising a frame configured to engage and retain the sheet in the parabolic curve or the semicircular curve, wherein the frame comprises a plurality of tabs configured to engage matching slots in the sheet.

18. A method of heating a heat-transfer medium, the method comprising filling the receptacle in the solar thermal device of claim 1 with the heat-transfer medium and exposing the solar thermal device to sunlight.

19. A sheet suitable for use as a solar concentrator comprising:
a first uppermost surface defining an entrance interface through which photons initially enter the sheet, the first uppermost surface having a first pattern defined therein, the first pattern configured to redirect photons incident upon the first uppermost surface over a predetermined range of incident angles into a narrower predetermined range of transmittance angles, wherein the incident angles and the transmittance angles are measured with respect to a global surface normal of the sheet, the global surface normal defined with respect to a flat plane extending longitudinally through the sheet, wherein the transmittance angles are more orthogonal with respect to the flat plane than the incident angles; and
a second surface disposed opposite the first uppermost surface and having a second pattern defined therein, the second pattern configured to focus the photons transmitted to the second surface onto a focal surface;
wherein the sheet is comprised of a polymeric material optically transparent to radiation present in sunlight,
wherein the first pattern comprises a plurality of projections extending in a direction opposite the second surface,
and further wherein the polymeric material from which the sheet is formed extends from the first uppermost surface to the second surface.

20. The sheet of claim 19, wherein the sheet is curved in one or more directions along a surface of the sheet.

21. A solar thermal device comprising:
a receptacle configured to contain a heat-transfer medium; and a sheet comprising a polymeric material optically transparent to radiation present in sunlight, the sheet configured over at least a portion of the surface of the receptacle, the sheet comprising:
a first surface having a first pattern defined therein, the first pattern configured to redirect photons incident upon the first surface over a predetermined range of incident angles into a narrower predetermined range of transmittance angles, wherein the incident angles and the transmittance angles are measured with respect to a global surface normal of the sheet, the global surface normal defined with respect to a flat plane extending longitudinally through the sheet, wherein the transmittance angles are more orthogonal with respect to the flat plane than the incident angles; and
a second surface disposed opposite the first surface and having a second pattern defined therein, the second pattern configured to focus the photons transmitted to the second surface onto the surface of the receptacle,
wherein the first pattern comprises a plurality of projections extending in a direction opposite the second surface,
wherein the sheet does not comprise a material capable of changing its index of refraction in response to an electromagnetic field,
wherein the second pattern comprises an array of lenses, each lens in the array characterized by a focal length, the array of lenses configured to focus the photons transmitted to the second surface to a plurality of focal points onto the surface of the receptacle,
and further wherein the polymeric material from which the sheet is formed extends from the first surface to the second surface.

22. The solar thermal device of claim 1, wherein the first uppermost surface and the second surface are disposed with respect to one another in a fixed relationship.

* * * * *